US008394444B2

(12) United States Patent
Cox et al.

(10) Patent No.: US 8,394,444 B2
(45) Date of Patent: Mar. 12, 2013

(54) OIL-IN-WATER EMULSION

(75) Inventors: Andrew Richard Cox, Sharnbrook (GB); Hyun-Jung Kim, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 411 days.

(21) Appl. No.: 12/780,294

(22) Filed: May 14, 2010

(65) Prior Publication Data

US 2010/0303998 A1 Dec. 2, 2010

(30) Foreign Application Priority Data

May 29, 2009 (EP) .................................... 09161585

(51) Int. Cl.
*A23D 7/00* (2006.01)

(52) U.S. Cl. ........................................ 426/602; 426/601

(58) Field of Classification Search .................. 426/602, 426/601
See application file for complete search history.

(56) References Cited

U.S. PATENT DOCUMENTS 2,604,406 A 7/1952 Blihovde
2,844,470 A 7/1958 Akerboom et al.
2,937,093 A 5/1960 Gorman et al.
2,970,917 A 2/1961 Melnick
3,266,214 A 8/1966 Kramme
3,346,387 A 10/1967 Moncrieff et al.
3,914,441 A 10/1975 Finney et al.
3,946,122 A 3/1976 Scharp
4,012,533 A 3/1977 Jonas
4,066,794 A 1/1978 Schur
4,146,652 A 3/1979 Kahn et al.
4,305,964 A 12/1981 Moran et al.
4,325,980 A 4/1982 Rek et al.
4,425,369 A 1/1984 Sakamoto et al.
4,542,035 A 9/1985 Huang et al.
4,627,631 A 12/1986 Sherman
4,627,983 A 12/1986 Scharf et al.
4,629,628 A 12/1986 Negro
4,668,519 A 5/1987 Dartey et al.
4,869,915 A 9/1989 Inayoshi et al.
4,874,627 A 10/1989 Greig et al.
4,946,625 A 8/1990 O'Lenick
4,954,440 A 9/1990 Johal et al.
4,960,540 A 10/1990 Friel et al.
5,084,295 A 1/1992 Whelan et al.
5,104,674 A 4/1992 Chen et al.
5,202,147 A 4/1993 Traska et al.
5,215,777 A 6/1993 Asher et al.
5,336,514 A 8/1994 Jones et al.
5,393,549 A 2/1995 Badertscher et al.
5,397,592 A 3/1995 Vermaas et al.
5,436,021 A 7/1995 Bodor et al.
5,486,372 A 1/1996 Martin et al.
5,536,514 A 7/1996 Bishay et al.
5,620,732 A 4/1997 Clemmings et al.
5,624,612 A 4/1997 Sewall et al.
5,681,505 A 10/1997 Phillips et al.
5,738,897 A 4/1998 Gidley
5,770,248 A 6/1998 Leibfred et al.
5,980,969 A 11/1999 Mordini et al.
6,096,867 A 8/2000 Byass et al.
6,187,365 B1 2/2001 Vaghela et al.
6,238,714 B1 5/2001 Binder et al.
6,284,303 B1 9/2001 Rowe et al.
6,497,913 B1 12/2002 Gray et al.
6,579,557 B1 6/2003 Benjamins et al.
6,685,977 B1 2/2004 Asano et al.
6,914,043 B1 7/2005 Champan et al.
7,338,779 B1 3/2008 Nakari-Setala et al.
8,038,740 B2 10/2011 Subkowski et al.
2001/0048962 A1 12/2001 Fenn et al.
2002/0085987 A1 7/2002 Brown et al.
2002/0155208 A1 10/2002 Benjamins et al.
2002/0182300 A1 12/2002 Groh et al.
2002/0197375 A1 12/2002 Adolphi et al.
2003/0087017 A1 5/2003 Hanselmann et al.
2003/0099751 A1 5/2003 Aldred et al.
2003/0134025 A1 7/2003 Vaghela et al.
2003/0148400 A1 8/2003 Haikara et al.
2003/0166960 A1 9/2003 de Vocht et al.
2003/0175407 A1 9/2003 Kunst et al.
2003/0190402 A1 10/2003 McBride
2004/0109930 A1 6/2004 Hooft et al.
2004/0161503 A1 8/2004 Malone et al.

(Continued)

FOREIGN PATENT DOCUMENTS

CA 1094866 10/2003
CA 1218557 11/2004
CA 2575325 2/2006
DE 29715519 11/1997
EP 216270 4/1987
EP 0274348 7/1988
EP 0285198 10/1988
EP 0322952 A2 7/1989
EP 336817 10/1989
EP 0426211 5/1991

(Continued)

OTHER PUBLICATIONS

Arbuckle, 1972, Ice Cream, Ice Cream, 2nd Edition, pp. 15, 18, 35, 61, 65.
Kinderlerer, 1997, *Chrysosporium* species, potential spoilage organisms of chocolate, Journal of Applied Microbiology, vol. 83, pp. 771-778.
Pardun, 1977, Soy Protein Preparations as Antispattering Agents for Margarine, Fette Seifen Anstrichmittel, vol. 79, No. 5, pp. 195-203.
Samsudin, May 26, 2010, Low-Fat Chocolate Spread Based on Palm Oil, Malasyian Palm Oil Board, ., pp. 27-30.

(Continued)

*Primary Examiner* — Carolyn Paden
(74) *Attorney, Agent, or Firm* — Alan A. Bornstein

(57) ABSTRACT

An oil-in-water emulsion comprising hydrophobin and oil wherein the oil-in-water emulsion has an overrun of less than 35% and wherein the oil phase has an iodine value of greater than 40 characterised in that the ratio of hydrophobin to oil is greater than 20 g/liter is provided. Products comprising such an oil-in-water emulsion is also provided.

20 Claims, No Drawings

U.S. PATENT DOCUMENTS

| | | | | |
|---|---|---|---|---|
| 2004/0185162 | A1 | 9/2004 | Finnigan et al. | |
| 2005/0037110 | A1 | 2/2005 | Windhab et al. | |
| 2005/0123666 | A1 | 6/2005 | Vaghela et al. | |
| 2005/0123668 | A1 | 6/2005 | Kodali et al. | |
| 2005/0129810 | A1 | 6/2005 | Lindner et al. | |
| 2005/0193744 | A1 | 9/2005 | Cockings et al. | |
| 2005/0220961 | A1 | 10/2005 | Cox et al. | |
| 2006/0024417 | A1 | 2/2006 | Berry et al. | |
| 2006/0024419 | A1 | 2/2006 | Aldred et al. | |
| 2007/0014908 | A1 | 1/2007 | Bramley et al. | |
| 2007/0071865 | A1 | 3/2007 | Aldred et al. | |
| 2007/0071866 | A1* | 3/2007 | Cox et al. | 426/565 |
| 2007/0116848 | A1* | 5/2007 | Aldred et al. | 426/564 |
| 2007/0286936 | A1 | 12/2007 | Bramley et al. | |
| 2007/0298490 | A1 | 12/2007 | Sweigard et al. | |
| 2008/0175972 | A1* | 7/2008 | Cox et al. | 426/565 |
| 2008/0187633 | A1 | 8/2008 | Cox | |
| 2008/0254180 | A1 | 10/2008 | Windhab et al. | |
| 2008/0305237 | A1 | 12/2008 | Beltman et al. | |
| 2009/0136433 | A1 | 5/2009 | Subkowski et al. | |
| 2009/0142467 | A1* | 6/2009 | Aldred et al. | 426/572 |
| 2010/0086662 | A1* | 4/2010 | Cox et al. | 426/564 |
| 2010/0303998 | A1 | 12/2010 | Cox et al. | |

FOREIGN PATENT DOCUMENTS

| | | | |
|---|---|---|---|
| EP | 0469656 | | 2/1992 |
| EP | 0521543 | | 1/1993 |
| EP | 0477825 | B1 | 12/1996 |
| EP | 775444 | A1 | 5/1997 |
| EP | 0777969 | | 6/1997 |
| EP | 777969 | | 6/1997 |
| EP | 0930017 | | 7/1999 |
| EP | 1061006 | | 12/2000 |
| EP | 1074181 | A1 | 2/2001 |
| EP | 0747301 | | 8/2001 |
| EP | 0919134 | | 11/2001 |
| EP | 0771531 | B1 | 9/2002 |
| EP | 1284106 | | 2/2003 |
| EP | 0995685 | | 4/2003 |
| EP | 1400486 | | 3/2004 |
| EP | 1520484 | | 4/2005 |
| EP | 1520485 | | 4/2005 |
| EP | 1557092 | | 7/2005 |
| EP | 1621084 | | 2/2006 |
| EP | 1621084 | A1 | 2/2006 |
| EP | 1623631 | | 2/2006 |
| EP | 1849461 | A1 | 10/2007 |
| EP | 2052628 | | 4/2009 |
| GB | 459583 | | 1/1937 |
| GB | 1556297 | | 11/1979 |
| JP | 530006491 | | 1/1978 |
| JP | 61219342 | | 9/1986 |
| JP | 61293348 | | 12/1986 |
| JP | 03164156 | | 7/1991 |
| JP | 3244348 | A | 10/1991 |
| JP | 5503426 | | 6/1993 |
| JP | 08500486 | | 1/1996 |
| JP | 2002508303 | | 12/1998 |
| JP | 2005278484 | | 10/2005 |
| KR | 2004018844 | | 3/2004 |
| WO | WO9013571 | | 11/1990 |
| WO | WO9222581 | | 12/1992 |
| WO | WO9403617 | | 2/1994 |
| WO | WO9412050 | | 6/1994 |
| WO | WO9413154 | | 6/1994 |
| WO | WO9523843 | | 9/1995 |
| WO | WO9611586 | | 4/1996 |
| WO | WO9621362 | | 7/1996 |
| WO | WO9641882 | | 12/1996 |
| WO | WO9804699 | | 2/1998 |
| WO | WO9937673 | | 7/1999 |
| WO | WO9954725 | | 10/1999 |
| WO | WO0022936 | | 4/2000 |
| WO | WO0038547 | | 7/2000 |
| WO | WO0053026 | | 9/2000 |
| WO | WO0058342 | | 10/2000 |
| WO | WO0114521 | | 3/2001 |
| WO | WO0135756 | A1 | 5/2001 |
| WO | WO0174864 | | 10/2001 |
| WO | WO0184945 | A1 | 11/2001 |
| WO | WO03015530 | A1 | 2/2003 |
| WO | WO03051136 | A1 | 6/2003 |
| WO | WO03053383 | | 7/2003 |
| WO | WO03053883 | | 7/2003 |
| WO | WO03096821 | | 11/2003 |
| WO | WO2005058055 | | 6/2005 |
| WO | WO2005058067 | A1 | 6/2005 |
| WO | WO2005102067 | | 11/2005 |
| WO | WO2005113387 | | 12/2005 |
| WO | WO2006010425 | | 2/2006 |
| WO | WO2007087967 | | 8/2007 |
| WO | WO2008031796 | A1 | 3/2008 |
| WO | WO2008116733 | | 10/2008 |
| WO | WO2009047657 | A2 | 4/2009 |
| WO | WO2010067059 | | 6/2010 |

OTHER PUBLICATIONS

Scott et al., 1983, Influence of Temperature on the Measurement of Water Activity of Food and Salt Systems, Journal of Food Science, vol. 48, pp. 552-554.

Dickinson, Dec. 2, 2010, Mixed biopolymers at interfaces: Competitive adsorption and multilayer structures, Food Hydrocolloids, 25, 1966-1983.

Fox, 1992, Analytical methods for Milk Proteins, Advanced Dairy Chemistry 1: Proteins, 1, 1, 6-7.

Graham et al, Jul. 3, 1979, Proteins at Liquid Interfaces, Journal of Colloid and Interface Science, 70, 415-426.

Miquelim et al., 2010, pH Influence on the stability of foams with protein-polysaccharide complexes at their interfaces, Food Hydrocolloids, 24, No. 4, 398-405.

Patino and Pilosof, 2011, Protein-polysaccharide interactions at fluid interfaces, Food Hydrocolloids, 25, 1925-1937.

Schmitt, Feb. 27, 2012, Declaration of Christophe Schmitt, Declaration of Christophe Schmitt, ., 1-4.

Wang et al, May 31, 2004, Protease a Stability of Beer Foam II, China Acadmic Journal Electronic Publishing House, ., 11-15.

Guinee et al, 2004, Salt in Cheese: Physical, Chemical and Biological Aspects, vol. 1, 3rd Ed., pp. 207-259.

Linder, Hydrophobins: the protein-amphiphiles of filamentous fungi, Microbiology Reviews, Jan. 21, 2005, vol. 29 No. 5, 877-896.

Research pushes the right buttons, mushrooms are the new fat, University of Birmingham, Feb. 25, 2008, 1-2.

Calonje, et al., Properties of a hydrophobin isolated from the mycoparasitic fungus *Verticillium fungicola*, Can J Microbiol, Dec. 13, 2002, 48, 1030-1034.

De Vries, et al., Identification & characterization of a tri-partite hydrophobin from *Claviceps fusiformis*, Eur J Biochem, Mar. 2, 1999, 262, 377-385.

Cruse, Whipped Soup is Tasty, St. Petersberg Independant, May 26, 1970, ., B-4.

Hunter, et al., The role of particles in stabilising foams and emulsions, Advances in Colloid & Interface Science, Jan. 1, 2008, 137, 57-81.

Scholtmeijer, et al., Fungal hydrophobins in medical and technical applications, Appl Microbiol Biotechnol, May 19, 2001, 56, 1-8.

Arbuckle, Ice Cream, Avi Publishing, Jan. 1, 1972, 2nd Ed, 284.

Wosten, et al., Hydrophobins the fungal coat unravelled, Biophysica Acta, May 29, 2000, 1469, 79-86.

CP Kelco US Inc., Certificate of Analysis for Keltrol RD, CP Kelco, Apr. 17, 2007, 1.

Berolzheimer, Culinary Arts Institute Encyclopedic Cookbook, Culinart Arts Institute, Jan. 1, 1988, 648.

Talbot, Aerial Morphogenesis Enter the Chaplins, Current Biology, Sep. 16, 2003, 13, R696-R698.

Murray, Stabilization of bubbles and foams, Current Opinion in Colloid & Interface Science, Aug. 3, 2007, 12, 232-241.

Murray, et al., Foam stability proteins and nanoparticles, Current Opinion in Colloid & Interface Sc, Jan. 1, 2004, 9, 314-320.

Damodaran, Adsorbed layers formed from mixtures of proteins, Current Opinion to Colloid & Interface Science, Oct. 27, 2004, 9, 328-339.

DICTIONARY.COM, Stabilizer, Dictionary.com, Jun. 14, 2010, 1.

Bay, La Cucina Italiana Italian Cuisine, Edizioni Piemme, Jan. 1, 2002, 1233.
Eleves, Teodora Gliga, Eleves, Jun. 8, 2007, 1.
Nakari-Setala, et al., Differential expression of the vegetative and spore-bound hydrophobins of *Trichoderma reesei*, Eur J. Biochem, May 26, 1997, 248, 415-423.
Tchuenbou-Magaia, et al., Hydrophobins stabilised air-filled emulsions for the food industry, Food Hydrocolloids, Mar. 16, 2009, 23, 1877-1885.
Kershaw, et al., Hydrophobins and Repellents Proteins with Fundamental Roles in Fungal Morphogenesis, Genetics & Biology, Jan. 1, 1998, 23, 18-33.
Wosten, et al., Interfacial self-assembly of a fungal hydrophobin into a hydrophobic rodlet layer, Plant Cell, Nov. 1, 1993, 5, 1567-1574.
Co-pending application, Aldred et al, U.S. Appl. No. 11/525,060, filed Sep. 21, 2006.
Co-pending application, Bot et al, U.S. Appl. No. 13/378,143, filed Dec. 14, 2011.
Co-pending application, Hedges et al, U.S. Appl. No. 12/636,157, filed Dec. 11, 2009.
Goh, Applications and Uses of Palm and Palm Kernel Oils, Malaysian Oil Science and Technology, Apr. 8, 2002, 11, 46-50.
CRC, Fennema's Food Chemistry, CRC Press, Jan. 1, 2008, 4th Ed., pp. 727-728, Taylor & Francis Group.
Kilcast, Sensory perception of creaminess & its relationship with food, Food Quality and Preference, Jun. 20, 2002, 13, 609-623, Elsevier.
De Vocht, et al., Structural Characterization of the Hydrophobin SC3, Biophysical Journal, Apr. 1, 1998, 74, 2059-2068, Biophysical Journal.
Hui, Encyclopedia of Food Science & Tehcnology, John Wiley & Sons, Jan. 1, 1992, 1, 204-210.
Bailey, et al., Process Technol effects of deletion & amplification of hydrophobins I & II in transformants of *Trich reesei*, Appl Microbiol Biotechnol, Jan. 31, 2002, 58, 721-727.
Collen, et al., A novel two-step extraction method w detergent polymer sys for primary recovery of the fusion protein endoglucanase I-hydro I, Biochimica et Biophysica Acta, Jan. 15, 2002, 1569, No. 1-3, 139-150.
Linder, et al, The hydrophobins HFBI & HFBII from *Trichoderma reesei* showing efficient interatctions w nonionic surfactants in aqueous two-phase sys, Biomacromolecules, Jul. 1, 2001, 2, No. 2, 511-517.
McGregor, et al., Antifoam effects on ultrafiltration, Biotechnology & Bioengineering, Jan. 1, 1988, 31, No. 4, 385-389.
Chaisalee, et al., Mechanism of Antifoam Behavior of Solutions of Nonionic Surfactants Above the Cloud Point, Journal of Surfactants & Detergents, Oct. 1, 2003, 6, No. 4, 345-351.
Holmes, et al., Evaluation of antifoams in the expression of a recombinant FC fusion protein in shake flask cultures, Microbial Cell Factories, Oct. 10, 2006, 5, No. 1, p. 30.
Hung, et al., Cloud-point extraction of selected polycyclic aromatic hydrocarbons by nonionic surfactants, Separation & Purification Tech, Aug. 20, 2007, 57, 1-10.
Cox, et al., Exceptional Stability of food foams using class II hydrophobin HFBII, Food Hydrocolloids, Jan. 1, 2009, 23, 366-376.
Cox, et al., Surface Properties of Class II Hydrophobins from *Trichoderma reesei* & Influence on bubble stability, Langmuir, Jun. 20, 2007, 23, 7995-8002.
Wessels, Hydrophobins Proteins that Change the Nature of the Fungal Surface, Advances in Microbial Physiology, Jan. 1, 1997, 38, No. 38, 1-45.
Wosten, Hydrophobins Multipurpose Proteins, Annu Rev Microbiol, Jan. 1, 2001, 55, 625-646.
Askolin, et al., Overproduction purification and characterization of *Trichoderma reesei* hydrophobin HFBI, Appl Microbiol Biotechnol, Aug. 9, 2001, 57, 124-130.
McCabe, et al., Secretion of Cryparin a Fungal Hydrophobin, Applied & Environmental Microbiology, Dec. 1, 1999, 65, No. 12, 5431-5435.
Askolin, et al., Interaction & comparison of a Class I Hydrophobin from *Schizophyllum commune* & Class II Hydro form *Trichoderma reesei*, Biomacromolecules, Jan. 10, 2006, 7, 1295-1301.
Lumsdon, et al., Adsorption of hydrophobin proteins at hydrophobic & hydrophilic interfaces, Colloids & Surfaces, Sep. 1, 2005, 44, 172-178.
Wosten, et al., Interfacial self-assembly of a hydrophobin into an amphipathic protein membrane mediates fungal attachment to hydrophobic surfaces, EMBO Journal, Jan. 1, 1994, 13, 5848-5854.
Swern, Baileys Industrial Oil and Fat Products, John Wiley & Sons, Jan. 1, 1979, 1, 369.
European Search Report, EP 09 16 1585, Sep. 29, 2009, 3 pp.
Co-pending appln. Berry et al., U.S. Appl. No. 11/168,209, filed Jun. 27, 2005.
Co-pending appln. Aldred et al., U.S. Appl. No. 11/168,214, filed Jun. 27, 2005.
Co-pending appln. Aldred et al., U.S. Appl. No. 11/524,977, filed Sep. 21, 2006.
Co-pending appln. Aldred et al., U.S. Appl. No. 11/525,060, filed Sep. 21, 2006.
Co-pending appln. Cox et al., U.S. Appl. No. 11/524,675, filed Sep. 21, 2006.
Co-pending appln. Bramley et al., U.S. Appl. No. 11/639,851, filed Dec. 15, 2006.
Co-pending appln. Cox et al., U.S. Appl. No. 11/699,601, filed Jan. 30, 2007.
Co-pending appln. Cox et al., U.S. Appl. No. 11/699,602, filed Jan. 30, 2007.
Co-pending appln. Burmester et al., U.S. Appl. No. 12/002,684, filed Dec. 18, 2007.
Co-pending application for Cox, et al., U.S. Appl. No. 12/682,717, filed Apr. 12, 2010.
Co-pending application Aldred et al., U.S. Appl. No. 12/287,957, filed Oct. 15, 2008.
Co-pending appln. Cox et al., U.S. Appl. No. 12/578,752, filed Oct. 14, 2009.
Co-pending application for Aldred, et al., U.S. Appl. No. 12/788,395, filed May 27, 2010.
Co-pending appln. Watts et al., U.S. Appl. No. 12/788,419, filed May 27, 2010.
Co-pending appln. Cox et al., U.S. Appl. No. 12/532,667, filed Sep. 23, 2009.
Co-pending appln. Cox et al., U.S. Appl. No. 12/532,670, filed Sep. 23, 2009.
Co-pending appln. Cox et al., U.S. Appl. No. 12/780,323, filed May 14, 2010.
Co-pending application Aumaitre et al., U.S. Appl. No. 12/409,549, filed Mar. 24, 2009.
Co-pending application for Hedges, U.S. Appl. No. 12/636,157, filed Dec. 11, 2009.
Notice of Opposition and Grounds of Opposition, dated Dec. 23, 2009—Nestec S.A./Unilever N.V. (EP1926399).
Response to Notice of Opposition, dated Oct. 29, 2010—Nestec S.A./Unilever N.V. (EP1926399).
Formo et al., 1979, Bailey Industrial Oil and Fat Products, vol. 1, 4th edition, pp. 317, 326, 377, 382, 398.
Jackson, Apr. 16, 2008, Hard or Soft, red or White—or a blend?, Flour Power, pp. 1-4.
Jan. 1, 2005, Fats Oils Fatty Acids Triglycerides, Scientific Psychic, 1-4.
Jun. 14, 2010, Guar Gum, Guargum.biz, 1.
Oct. 16, 2009, Search proteins matching the sequence pattern used for the hydrophobin definition in patent EP 1926 399 B1, Nestle Research Center, 1-3.
Arbuckle, Jan. 1, 1972, Ice Cream, Ice Cream 2nd Ed 1972 pp. 35 266 284-285, 2nd Edition, 35, 266, 284-285.
Arbuckle, 1972, Ice Cream, Ice Cream, 2nd Ed., 265, Avi Publishing Company.
Arbuckle, 1972, Ice Cream, Ice Cream, 2nd, 31.
Askolin, et al., Aug. 9, 2001, Overproduction purification and characterization of *Trichoderma reesei* hydrophobin HFBI, Appl Microbiol Biotechnol, 57, 124-130.
Chakraborty, et al., Jan. 1, 1972, Stabilization of Calcium Sensitive Plant Proteins by k-Carrageenan, Journal of Food Science, 37, 719-721.

Cheer, et al., Jan. 1, 1983, Effects of Sucrose on the Rheological Behavior of Wheat Starch Pastes, Journal of Applied Polymer Science, 28, 1829-1836.
CRC, Jan. 1, 2008, Fennema's Food Chemistry, CRC Press, 4th Ed., pp. 727-728, Taylor & Francis Group.
Davis, et al., Jan. 1, 2001, Application of foaming for the recovery of surfactin from *B. subtilis* ATCC 21332 cultures, Enzyme & Microbial Technology, 28, 346-354.
De Vocht et al., Apr. 1998, Structural Characterization of the Hydrophobin SC3, as a Monomer and after Self-Assembly at Hydrophobic/Hydrophilic Interfaces, Biophysical Journal, 74, 2059-2068.
Dr. E. Kododziejcxzyk, Nov. 16, 2009, Adsortion of different proteins to Teflon sheets: Experimental Results, Nestle Research Center.
Fellows, 2000, Principles and Practice, Food processing technology, 2nd, 83, 140, 429, Foodhead Publishing.
Fox, et al., Jan. 1, 2004, Cheese: Physical, Chemical and Biological Aspects, Cheese Chemistry, Physics & Microbiology, 3rd, vol. 1, 207-223.
Grant, Jan. 1, 1987, Grant & Hackh's Chemical Dictionary, McGraw-Hill, 5th Ed, 212.
Guner, et al., Jan. 1, 2007, Production of yogurt ice cream at different acidity, Intl Journ of Food Sc & Tech, 42, 948-952.
Hakanpaa, et al., Jan. 2, 2004, Atomic Resolution Structure of the HFBII Hydrophobin a Self-assembling Amphiphile, Journal of Biological Chemistry, 279, No. 1, 534-539.
Katzbauer et al, Jun. 19, 1997, Properties and applications of xanthan gum, Polymer Degradation and Stability, vol. 59, 81-84, Elsevier.
Kilkast et al., Jun. 20, 2002, Sensory perception of creaminess and its relationship with food structure, Food Quality and Preference, 13, 609-623.
Kloek, et al., Feb. 2, 2001, Effect of Bulk and Interfacial Rheological Properties on Bubble Dissolution, Journal of Colloid & Interface Sc, 237, 158-166.
Lambou et al., 1973, Whey Solids as Agricultural Foam Stabilizers, Jr. of Agr. and Food Chemistry, 21 No. 2, 257-263.
Marshall, Jan. 1, 2003, Ice Cream, Springer, 6th Ed, 70-73.
Martin, et al., Jan. 14, 2000, Sc30 Hydrophobin Organization in Aqueous Media & Assembly onto Surfaces as Mediated by Assoc Polysaccharide Schizophyllan, Biomacromolecules, 1, 49-60.
Mathlouthi, et al., Jan. 1, 1995, Rheological properties of sucrose solutions and suspensions, Sucrose Properties & Applic, 126-154.
Minor, et al., Jan. 1, 2009, Preparation and sensory perception of fat-free foams effect of matrix properties and level of aeration, Intl Journ of Food Sc & Tech, 44, 735-747.
Penttila, et al., Jan. 1, 2004, Molecular Biology of *Trichoderma* & Biotechnological Applications, Handbook of Fungal Biotech, 2nd Ed, 413-427.
Quintas, et al., Jan. 1, 2006, Rheology of superstaurated sucrose solutions, Journal of Food Engineering, 77, 844-852.
Russo, et al., Jan. 1, 1982, Surface activity of the phytotoxin cerato-ulmin, Natl Research Council of Canada, 60, 1414-1422.
Sanderson, 1981, Applications of Xanthan Gum, British Polymer Jr., 13, 71-75.
Sienkiewicz, Jan. 1, 1990, Whey and Whey Utilization, Verlag Th Mann, 2nd Ed, 82-83.
Soukoulis, et al., May 2, 2008, Impact of the acidification process hydrocolloids & protein fortifiers on the physical & Sensory properties of frozen yogurt, Intl Journal of Dairy Tech, 61, No. 2, 170-177.
Stringer, et al., Feb. 1, 1993, Cerato-ulmin a toxin involved in dutch elm disease is a fungal hydrophobin, Plant Cell, 145-146.
Takai, et al., Jan. 1, 1978, Cerato-ulmin, a wilting toxin of *Ceratocystis ulmi*: isolation & some properties of cerato-ulmin from the culture of *C. ulmi*, Phytopath, 91, 129-146.
Talbot, Jan. 1, 2001, 7 Fungal Hydrophobins, Howard & Gow, 7, 145-159.
Talbot, et al., Jun. 1, 1996, MPG1 encodes a fungal hydrophobin involved in surface interactions during infection-related develop of *Magnaporthe grisea*, Plant Cell, 8, 985-999.
Temple, 2000, Biological Roles for cerato-Ulmin, a Hydrophobin secreted by the elm pathogens, *Opthiostoma ulmi* and *O. novo-ulmi*, Micological Society of America, 92, 1-9.
Van Der Werf, Jan. 1, 2000, Green coatings healthy foods and drug targeting, Leads in Life Science, 5, 1.
Wessels, et al., Jan. 1, 1996, Fungal hydrophobins proteins that function at an interface, Trends in Plant Science, 1, No. 1, 9-15.
Whitcomb, et al., Jan. 1, 1980, Rheology of Guar Solutions, Journal of Applied Polymer Sc, 25, 2815-2827.
2012, West Search History for U.S. Appl. No. 12/636,157, Carbohydrates, pp. 1-29.
Joseph M. Light, 1990, Modified Food Starches Why What Where and How, Modified Food Starches, vol. 35, No. 11, pp. 1-20.
Co-Pending application Mitchell et al., U.S. Appl. No. 13/498,157, filed Mar. 26, 2012.

* cited by examiner

SEQUENCE LISTING

```
<160> NUMBER OF SEQ ID NOS: 2

<210> SEQ ID NO 1
<211> LENGTH: 4106
<212> TYPE: PRT
<213> ORGANISM: Artificial
<220> FEATURE:
<223> OTHER INFORMATION: Exemplary sequence used to illustrate
      invention.
<220> FEATURE:
<221> NAME/KEY: REPEAT
<222> LOCATION: (1)..(2000)
<223> OTHER INFORMATION: Xaa is any amino acid and can be shown 1 to
      2000 times.
```

<220> FEATURE:
<221> NAME/KEY: REPEAT
<222> LOCATION: (2002)..(2010)
<223> OTHER INFORMATION: Xaa is any amino acid and can be shown 5 to
9 times.
<220> FEATURE:
<221> NAME/KEY: REPEAT
<222> LOCATION: (2013)..(2051)
<223> OTHER INFORMATION: Xaa is any amino acid and can be shown 11 to
39 times.
<220> FEATURE:
<221> NAME/KEY: REPEAT
<222> LOCATION: (2053)..(2075)
<223> OTHER INFORMATION: Xaa is any amino acid and can be shown 8 to
23 times.
<220> FEATURE:
<221> NAME/KEY: REPEAT
<222> LOCATION: (2077)..(2085)
<223> OTHER INFORMATION: Xaa is any amino acid and can be shown 5 to
9 times.
<220> FEATURE:
<221> NAME/KEY: REPEAT
<222> LOCATION: (2088)..(2105)
<223> OTHER INFORMATION: Xaa is any amino acid and can be shown 6 to
18 times.
<220> FEATURE:
<221> NAME/KEY: REPEAT
<222> LOCATION: (2107)..(4106)
<223> OTHER INFORMATION: indefinite repeats. Xaa is any amino acid.

<400> SEQUENCE: 1

Xaa Xaa Xaa Xaa Xaa Xaa Xaa Xaa Xaa Xaa Xaa Xaa Xaa Xaa Xaa Xaa
1 5 10 15

Xaa Xaa Xaa Xaa Xaa Xaa Xaa Xaa Xaa Xaa Xaa Xaa Xaa Xaa Xaa Xaa
20 25 30

Xaa Xaa Xaa Xaa Xaa Xaa Xaa Xaa Xaa Xaa Xaa Xaa Xaa Xaa Xaa Xaa
35 40 45

Xaa Xaa Xaa Xaa Xaa Xaa Xaa Xaa Xaa Xaa Xaa Xaa Xaa Xaa Xaa Xaa
50 55 60

Xaa Xaa Xaa Xaa Xaa Xaa Xaa Xaa Xaa Xaa Xaa Xaa Xaa Xaa Xaa Xaa
65 70 75 80

Xaa Xaa Xaa Xaa Xaa Xaa Xaa Xaa Xaa Xaa Xaa Xaa Xaa Xaa Xaa Xaa
85 90 95

Xaa Xaa Xaa Xaa Xaa Xaa Xaa Xaa Xaa Xaa Xaa Xaa Xaa Xaa Xaa Xaa
100 105 110

Xaa Xaa Xaa Xaa Xaa Xaa Xaa Xaa Xaa Xaa Xaa Xaa Xaa Xaa Xaa Xaa
115 120 125

Xaa Xaa Xaa Xaa Xaa Xaa Xaa Xaa Xaa Xaa Xaa Xaa Xaa Xaa Xaa Xaa
130 135 140

Xaa Xaa Xaa Xaa Xaa Xaa Xaa Xaa Xaa Xaa Xaa Xaa Xaa Xaa Xaa Xaa
145 150 155 160

Xaa Xaa Xaa Xaa Xaa Xaa Xaa Xaa Xaa Xaa Xaa Xaa Xaa Xaa Xaa Xaa
165 170 175

Xaa Xaa Xaa Xaa Xaa Xaa Xaa Xaa Xaa Xaa Xaa Xaa Xaa Xaa Xaa Xaa
180 185 190

Xaa Xaa Xaa Xaa Xaa Xaa Xaa Xaa Xaa Xaa Xaa Xaa Xaa Xaa Xaa Xaa
195 200 205

Xaa Xaa Xaa Xaa Xaa Xaa Xaa Xaa Xaa Xaa Xaa Xaa Xaa Xaa Xaa Xaa
210 215 220

Xaa Xaa Xaa Xaa Xaa Xaa Xaa Xaa Xaa Xaa Xaa Xaa Xaa Xaa Xaa Xaa
225 230 235 240

Xaa Xaa Xaa Xaa Xaa Xaa Xaa Xaa Xaa Xaa Xaa Xaa Xaa Xaa Xaa Xaa
245 250 255

-continued

```
Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590

Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa Xaa
        675                 680                 685
```

-continued

```
Xaa Xaa Xaa Xaa Xaa Xaa Xaa Xaa Xaa Xaa Xaa Xaa Xaa Xaa Xaa Xaa
    690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815

Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa Xaa Xaa Xaa Xaa Xaa Xaa Xaa Xaa
        995                 1000                1005

Xaa Xaa Xaa Xaa Xaa Xaa Xaa Xaa Xaa Xaa Xaa Xaa Xaa Xaa Xaa Xaa
    1010                1015                1020

Xaa Xaa Xaa Xaa Xaa Xaa Xaa Xaa Xaa Xaa Xaa Xaa Xaa Xaa Xaa Xaa
1025                1030                1035                1040

Xaa Xaa Xaa Xaa Xaa Xaa Xaa Xaa Xaa Xaa Xaa Xaa Xaa Xaa Xaa Xaa
                1045                1050                1055

Xaa Xaa Xaa Xaa Xaa Xaa Xaa Xaa Xaa Xaa Xaa Xaa Xaa Xaa Xaa Xaa
            1060                1065                1070

Xaa Xaa Xaa Xaa Xaa Xaa Xaa Xaa Xaa Xaa Xaa Xaa Xaa Xaa Xaa Xaa
        1075                1080                1085

Xaa Xaa Xaa Xaa Xaa Xaa Xaa Xaa Xaa Xaa Xaa Xaa Xaa Xaa Xaa Xaa
    1090                1095                1100

Xaa Xaa Xaa Xaa Xaa Xaa Xaa Xaa Xaa Xaa Xaa Xaa Xaa Xaa Xaa Xaa
1105                1110                1115                1120
```

-continued

```
Xaa Xaa Xaa Xaa Xaa Xaa Xaa Xaa Xaa Xaa Xaa Xaa Xaa Xaa Xaa Xaa
                1125                1130                1135

Xaa Xaa Xaa Xaa Xaa Xaa Xaa Xaa Xaa Xaa Xaa Xaa Xaa Xaa Xaa Xaa
            1140                1145                1150

Xaa Xaa Xaa Xaa Xaa Xaa Xaa Xaa Xaa Xaa Xaa Xaa Xaa Xaa Xaa Xaa
        1155                1160                1165

Xaa Xaa Xaa Xaa Xaa Xaa Xaa Xaa Xaa Xaa Xaa Xaa Xaa Xaa Xaa Xaa
    1170                1175                1180

Xaa Xaa Xaa Xaa Xaa Xaa Xaa Xaa Xaa Xaa Xaa Xaa Xaa Xaa Xaa Xaa
1185                1190                1195                1200

Xaa Xaa Xaa Xaa Xaa Xaa Xaa Xaa Xaa Xaa Xaa Xaa Xaa Xaa Xaa Xaa
                1205                1210                1215

Xaa Xaa Xaa Xaa Xaa Xaa Xaa Xaa Xaa Xaa Xaa Xaa Xaa Xaa Xaa Xaa
            1220                1225                1230

Xaa Xaa Xaa Xaa Xaa Xaa Xaa Xaa Xaa Xaa Xaa Xaa Xaa Xaa Xaa Xaa
        1235                1240                1245

Xaa Xaa Xaa Xaa Xaa Xaa Xaa Xaa Xaa Xaa Xaa Xaa Xaa Xaa Xaa Xaa
    1250                1255                1260

Xaa Xaa Xaa Xaa Xaa Xaa Xaa Xaa Xaa Xaa Xaa Xaa Xaa Xaa Xaa Xaa
1265                1270                1275                1280

Xaa Xaa Xaa Xaa Xaa Xaa Xaa Xaa Xaa Xaa Xaa Xaa Xaa Xaa Xaa Xaa
                1285                1290                1295

Xaa Xaa Xaa Xaa Xaa Xaa Xaa Xaa Xaa Xaa Xaa Xaa Xaa Xaa Xaa Xaa
            1300                1305                1310

Xaa Xaa Xaa Xaa Xaa Xaa Xaa Xaa Xaa Xaa Xaa Xaa Xaa Xaa Xaa Xaa
        1315                1320                1325

Xaa Xaa Xaa Xaa Xaa Xaa Xaa Xaa Xaa Xaa Xaa Xaa Xaa Xaa Xaa Xaa
    1330                1335                1340

Xaa Xaa Xaa Xaa Xaa Xaa Xaa Xaa Xaa Xaa Xaa Xaa Xaa Xaa Xaa Xaa
1345                1350                1355                1360

Xaa Xaa Xaa Xaa Xaa Xaa Xaa Xaa Xaa Xaa Xaa Xaa Xaa Xaa Xaa Xaa
                1365                1370                1375

Xaa Xaa Xaa Xaa Xaa Xaa Xaa Xaa Xaa Xaa Xaa Xaa Xaa Xaa Xaa Xaa
            1380                1385                1390

Xaa Xaa Xaa Xaa Xaa Xaa Xaa Xaa Xaa Xaa Xaa Xaa Xaa Xaa Xaa Xaa
        1395                1400                1405

Xaa Xaa Xaa Xaa Xaa Xaa Xaa Xaa Xaa Xaa Xaa Xaa Xaa Xaa Xaa Xaa
    1410                1415                1420

Xaa Xaa Xaa Xaa Xaa Xaa Xaa Xaa Xaa Xaa Xaa Xaa Xaa Xaa Xaa Xaa
1425                1430                1435                1440

Xaa Xaa Xaa Xaa Xaa Xaa Xaa Xaa Xaa Xaa Xaa Xaa Xaa Xaa Xaa Xaa
                1445                1450                1455

Xaa Xaa Xaa Xaa Xaa Xaa Xaa Xaa Xaa Xaa Xaa Xaa Xaa Xaa Xaa Xaa
            1460                1465                1470

Xaa Xaa Xaa Xaa Xaa Xaa Xaa Xaa Xaa Xaa Xaa Xaa Xaa Xaa Xaa Xaa
        1475                1480                1485

Xaa Xaa Xaa Xaa Xaa Xaa Xaa Xaa Xaa Xaa Xaa Xaa Xaa Xaa Xaa Xaa
    1490                1495                1500

Xaa Xaa Xaa Xaa Xaa Xaa Xaa Xaa Xaa Xaa Xaa Xaa Xaa Xaa Xaa Xaa
1505                1510                1515                1520

Xaa Xaa Xaa Xaa Xaa Xaa Xaa Xaa Xaa Xaa Xaa Xaa Xaa Xaa Xaa Xaa
                1525                1530                1535

Xaa Xaa Xaa Xaa Xaa Xaa Xaa Xaa Xaa Xaa Xaa Xaa Xaa Xaa Xaa Xaa
            1540                1545                1550
```

-continued

```
Xaa Xaa Xaa Xaa Xaa Xaa Xaa Xaa Xaa Xaa Xaa Xaa Xaa Xaa Xaa Xaa
        1555                1560                1565

Xaa Xaa Xaa Xaa Xaa Xaa Xaa Xaa Xaa Xaa Xaa Xaa Xaa Xaa Xaa Xaa
    1570                1575                1580

Xaa Xaa Xaa Xaa Xaa Xaa Xaa Xaa Xaa Xaa Xaa Xaa Xaa Xaa Xaa Xaa
1585                1590                1595                1600

Xaa Xaa Xaa Xaa Xaa Xaa Xaa Xaa Xaa Xaa Xaa Xaa Xaa Xaa Xaa Xaa
                1605                1610                1615

Xaa Xaa Xaa Xaa Xaa Xaa Xaa Xaa Xaa Xaa Xaa Xaa Xaa Xaa Xaa Xaa
            1620                1625                1630

Xaa Xaa Xaa Xaa Xaa Xaa Xaa Xaa Xaa Xaa Xaa Xaa Xaa Xaa Xaa Xaa
        1635                1640                1645

Xaa Xaa Xaa Xaa Xaa Xaa Xaa Xaa Xaa Xaa Xaa Xaa Xaa Xaa Xaa Xaa
    1650                1655                1660

Xaa Xaa Xaa Xaa Xaa Xaa Xaa Xaa Xaa Xaa Xaa Xaa Xaa Xaa Xaa Xaa
1665                1670                1675                1680

Xaa Xaa Xaa Xaa Xaa Xaa Xaa Xaa Xaa Xaa Xaa Xaa Xaa Xaa Xaa Xaa
                1685                1690                1695

Xaa Xaa Xaa Xaa Xaa Xaa Xaa Xaa Xaa Xaa Xaa Xaa Xaa Xaa Xaa Xaa
            1700                1705                1710

Xaa Xaa Xaa Xaa Xaa Xaa Xaa Xaa Xaa Xaa Xaa Xaa Xaa Xaa Xaa Xaa
        1715                1720                1725

Xaa Xaa Xaa Xaa Xaa Xaa Xaa Xaa Xaa Xaa Xaa Xaa Xaa Xaa Xaa Xaa
    1730                1735                1740

Xaa Xaa Xaa Xaa Xaa Xaa Xaa Xaa Xaa Xaa Xaa Xaa Xaa Xaa Xaa Xaa
1745                1750                1755                1760

Xaa Xaa Xaa Xaa Xaa Xaa Xaa Xaa Xaa Xaa Xaa Xaa Xaa Xaa Xaa Xaa
                1765                1770                1775

Xaa Xaa Xaa Xaa Xaa Xaa Xaa Xaa Xaa Xaa Xaa Xaa Xaa Xaa Xaa Xaa
            1780                1785                1790

Xaa Xaa Xaa Xaa Xaa Xaa Xaa Xaa Xaa Xaa Xaa Xaa Xaa Xaa Xaa Xaa
        1795                1800                1805

Xaa Xaa Xaa Xaa Xaa Xaa Xaa Xaa Xaa Xaa Xaa Xaa Xaa Xaa Xaa Xaa
    1810                1815                1820

Xaa Xaa Xaa Xaa Xaa Xaa Xaa Xaa Xaa Xaa Xaa Xaa Xaa Xaa Xaa Xaa
1825                1830                1835                1840

Xaa Xaa Xaa Xaa Xaa Xaa Xaa Xaa Xaa Xaa Xaa Xaa Xaa Xaa Xaa Xaa
                1845                1850                1855

Xaa Xaa Xaa Xaa Xaa Xaa Xaa Xaa Xaa Xaa Xaa Xaa Xaa Xaa Xaa Xaa
            1860                1865                1870

Xaa Xaa Xaa Xaa Xaa Xaa Xaa Xaa Xaa Xaa Xaa Xaa Xaa Xaa Xaa Xaa
        1875                1880                1885

Xaa Xaa Xaa Xaa Xaa Xaa Xaa Xaa Xaa Xaa Xaa Xaa Xaa Xaa Xaa Xaa
    1890                1895                1900

Xaa Xaa Xaa Xaa Xaa Xaa Xaa Xaa Xaa Xaa Xaa Xaa Xaa Xaa Xaa Xaa
1905                1910                1915                1920

Xaa Xaa Xaa Xaa Xaa Xaa Xaa Xaa Xaa Xaa Xaa Xaa Xaa Xaa Xaa Xaa
                1925                1930                1935

Xaa Xaa Xaa Xaa Xaa Xaa Xaa Xaa Xaa Xaa Xaa Xaa Xaa Xaa Xaa Xaa
            1940                1945                1950

Xaa Xaa Xaa Xaa Xaa Xaa Xaa Xaa Xaa Xaa Xaa Xaa Xaa Xaa Xaa Xaa
        1955                1960                1965

Xaa Xaa Xaa Xaa Xaa Xaa Xaa Xaa Xaa Xaa Xaa Xaa Xaa Xaa Xaa Xaa
    1970                1975                1980
```

-continued

```
Xaa Xaa Xaa Xaa Xaa Xaa Xaa Xaa Xaa Xaa Xaa Xaa Xaa Xaa Xaa Xaa
1985                1990                1995                2000

Cys Xaa Xaa Xaa Xaa Xaa Xaa Xaa Xaa Xaa Cys Cys Xaa Xaa Xaa Xaa
                2005                2010                2015

Xaa Xaa Xaa Xaa Xaa Xaa Xaa Xaa Xaa Xaa Xaa Xaa Xaa Xaa Xaa Xaa
            2020                2025                2030

Xaa Xaa Xaa Xaa Xaa Xaa Xaa Xaa Xaa Xaa Xaa Xaa Xaa Xaa Xaa Xaa
        2035                2040                2045

Xaa Xaa Xaa Cys Xaa Xaa Xaa Xaa Xaa Xaa Xaa Xaa Xaa Xaa Xaa Xaa
    2050                2055                2060

Xaa Xaa Xaa Xaa Xaa Xaa Xaa Xaa Xaa Xaa Xaa Cys Xaa Xaa Xaa Xaa
2065                2070                2075                2080

Xaa Xaa Xaa Xaa Xaa Cys Cys Xaa Xaa Xaa Xaa Xaa Xaa Xaa Xaa Xaa
                2085                2090                2095

Xaa Xaa Xaa Xaa Xaa Xaa Xaa Xaa Xaa Cys Xaa Xaa Xaa Xaa Xaa Xaa
            2100                2105                2110

Xaa Xaa Xaa Xaa Xaa Xaa Xaa Xaa Xaa Xaa Xaa Xaa Xaa Xaa Xaa Xaa
        2115                2120                2125

Xaa Xaa Xaa Xaa Xaa Xaa Xaa Xaa Xaa Xaa Xaa Xaa Xaa Xaa Xaa Xaa
    2130                2135                2140

Xaa Xaa Xaa Xaa Xaa Xaa Xaa Xaa Xaa Xaa Xaa Xaa Xaa Xaa Xaa Xaa
2145                2150                2155                2160

Xaa Xaa Xaa Xaa Xaa Xaa Xaa Xaa Xaa Xaa Xaa Xaa Xaa Xaa Xaa Xaa
                2165                2170                2175

Xaa Xaa Xaa Xaa Xaa Xaa Xaa Xaa Xaa Xaa Xaa Xaa Xaa Xaa Xaa Xaa
            2180                2185                2190

Xaa Xaa Xaa Xaa Xaa Xaa Xaa Xaa Xaa Xaa Xaa Xaa Xaa Xaa Xaa Xaa
        2195                2200                2205

Xaa Xaa Xaa Xaa Xaa Xaa Xaa Xaa Xaa Xaa Xaa Xaa Xaa Xaa Xaa Xaa
    2210                2215                2220

Xaa Xaa Xaa Xaa Xaa Xaa Xaa Xaa Xaa Xaa Xaa Xaa Xaa Xaa Xaa Xaa
2225                2230                2235                2240

Xaa Xaa Xaa Xaa Xaa Xaa Xaa Xaa Xaa Xaa Xaa Xaa Xaa Xaa Xaa Xaa
                2245                2250                2255

Xaa Xaa Xaa Xaa Xaa Xaa Xaa Xaa Xaa Xaa Xaa Xaa Xaa Xaa Xaa Xaa
            2260                2265                2270

Xaa Xaa Xaa Xaa Xaa Xaa Xaa Xaa Xaa Xaa Xaa Xaa Xaa Xaa Xaa Xaa
        2275                2280                2285

Xaa Xaa Xaa Xaa Xaa Xaa Xaa Xaa Xaa Xaa Xaa Xaa Xaa Xaa Xaa Xaa
    2290                2295                2300

Xaa Xaa Xaa Xaa Xaa Xaa Xaa Xaa Xaa Xaa Xaa Xaa Xaa Xaa Xaa Xaa
2305                2310                2315                2320

Xaa Xaa Xaa Xaa Xaa Xaa Xaa Xaa Xaa Xaa Xaa Xaa Xaa Xaa Xaa Xaa
                2325                2330                2335

Xaa Xaa Xaa Xaa Xaa Xaa Xaa Xaa Xaa Xaa Xaa Xaa Xaa Xaa Xaa Xaa
            2340                2345                2350

Xaa Xaa Xaa Xaa Xaa Xaa Xaa Xaa Xaa Xaa Xaa Xaa Xaa Xaa Xaa Xaa
        2355                2360                2365

Xaa Xaa Xaa Xaa Xaa Xaa Xaa Xaa Xaa Xaa Xaa Xaa Xaa Xaa Xaa Xaa
    2370                2375                2380

Xaa Xaa Xaa Xaa Xaa Xaa Xaa Xaa Xaa Xaa Xaa Xaa Xaa Xaa Xaa Xaa
2385                2390                2395                2400

Xaa Xaa Xaa Xaa Xaa Xaa Xaa Xaa Xaa Xaa Xaa Xaa Xaa Xaa Xaa Xaa
                2405                2410                2415
```

-continued

```
Xaa Xaa Xaa Xaa Xaa Xaa Xaa Xaa Xaa Xaa Xaa Xaa Xaa Xaa Xaa Xaa
            2420                2425                2430

Xaa Xaa Xaa Xaa Xaa Xaa Xaa Xaa Xaa Xaa Xaa Xaa Xaa Xaa Xaa Xaa
        2435                2440                2445

Xaa Xaa Xaa Xaa Xaa Xaa Xaa Xaa Xaa Xaa Xaa Xaa Xaa Xaa Xaa Xaa
    2450                2455                2460

Xaa Xaa Xaa Xaa Xaa Xaa Xaa Xaa Xaa Xaa Xaa Xaa Xaa Xaa Xaa Xaa
2465                2470                2475                2480

Xaa Xaa Xaa Xaa Xaa Xaa Xaa Xaa Xaa Xaa Xaa Xaa Xaa Xaa Xaa Xaa
                2485                2490                2495

Xaa Xaa Xaa Xaa Xaa Xaa Xaa Xaa Xaa Xaa Xaa Xaa Xaa Xaa Xaa Xaa
            2500                2505                2510

Xaa Xaa Xaa Xaa Xaa Xaa Xaa Xaa Xaa Xaa Xaa Xaa Xaa Xaa Xaa Xaa
        2515                2520                2525

Xaa Xaa Xaa Xaa Xaa Xaa Xaa Xaa Xaa Xaa Xaa Xaa Xaa Xaa Xaa Xaa
    2530                2535                2540

Xaa Xaa Xaa Xaa Xaa Xaa Xaa Xaa Xaa Xaa Xaa Xaa Xaa Xaa Xaa Xaa
2545                2550                2555                2560

Xaa Xaa Xaa Xaa Xaa Xaa Xaa Xaa Xaa Xaa Xaa Xaa Xaa Xaa Xaa Xaa
                2565                2570                2575

Xaa Xaa Xaa Xaa Xaa Xaa Xaa Xaa Xaa Xaa Xaa Xaa Xaa Xaa Xaa Xaa
            2580                2585                2590

Xaa Xaa Xaa Xaa Xaa Xaa Xaa Xaa Xaa Xaa Xaa Xaa Xaa Xaa Xaa Xaa
        2595                2600                2605

Xaa Xaa Xaa Xaa Xaa Xaa Xaa Xaa Xaa Xaa Xaa Xaa Xaa Xaa Xaa Xaa
    2610                2615                2620

Xaa Xaa Xaa Xaa Xaa Xaa Xaa Xaa Xaa Xaa Xaa Xaa Xaa Xaa Xaa Xaa
2625                2630                2635                2640

Xaa Xaa Xaa Xaa Xaa Xaa Xaa Xaa Xaa Xaa Xaa Xaa Xaa Xaa Xaa Xaa
                2645                2650                2655

Xaa Xaa Xaa Xaa Xaa Xaa Xaa Xaa Xaa Xaa Xaa Xaa Xaa Xaa Xaa Xaa
            2660                2665                2670

Xaa Xaa Xaa Xaa Xaa Xaa Xaa Xaa Xaa Xaa Xaa Xaa Xaa Xaa Xaa Xaa
        2675                2680                2685

Xaa Xaa Xaa Xaa Xaa Xaa Xaa Xaa Xaa Xaa Xaa Xaa Xaa Xaa Xaa Xaa
    2690                2695                2700

Xaa Xaa Xaa Xaa Xaa Xaa Xaa Xaa Xaa Xaa Xaa Xaa Xaa Xaa Xaa Xaa
2705                2710                2715                2720

Xaa Xaa Xaa Xaa Xaa Xaa Xaa Xaa Xaa Xaa Xaa Xaa Xaa Xaa Xaa Xaa
                2725                2730                2735

Xaa Xaa Xaa Xaa Xaa Xaa Xaa Xaa Xaa Xaa Xaa Xaa Xaa Xaa Xaa Xaa
            2740                2745                2750

Xaa Xaa Xaa Xaa Xaa Xaa Xaa Xaa Xaa Xaa Xaa Xaa Xaa Xaa Xaa Xaa
        2755                2760                2765

Xaa Xaa Xaa Xaa Xaa Xaa Xaa Xaa Xaa Xaa Xaa Xaa Xaa Xaa Xaa Xaa
    2770                2775                2780

Xaa Xaa Xaa Xaa Xaa Xaa Xaa Xaa Xaa Xaa Xaa Xaa Xaa Xaa Xaa Xaa
2785                2790                2795                2800

Xaa Xaa Xaa Xaa Xaa Xaa Xaa Xaa Xaa Xaa Xaa Xaa Xaa Xaa Xaa Xaa
                2805                2810                2815

Xaa Xaa Xaa Xaa Xaa Xaa Xaa Xaa Xaa Xaa Xaa Xaa Xaa Xaa Xaa Xaa
            2820                2825                2830

Xaa Xaa Xaa Xaa Xaa Xaa Xaa Xaa Xaa Xaa Xaa Xaa Xaa Xaa Xaa Xaa
        2835                2840                2845
```

-continued

```
Xaa Xaa Xaa Xaa Xaa Xaa Xaa Xaa Xaa Xaa Xaa Xaa Xaa Xaa Xaa Xaa
    2850                2855                2860

Xaa Xaa Xaa Xaa Xaa Xaa Xaa Xaa Xaa Xaa Xaa Xaa Xaa Xaa Xaa Xaa
2865                2870                2875                2880

Xaa Xaa Xaa Xaa Xaa Xaa Xaa Xaa Xaa Xaa Xaa Xaa Xaa Xaa Xaa Xaa
                2885                2890                2895

Xaa Xaa Xaa Xaa Xaa Xaa Xaa Xaa Xaa Xaa Xaa Xaa Xaa Xaa Xaa Xaa
            2900                2905                2910

Xaa Xaa Xaa Xaa Xaa Xaa Xaa Xaa Xaa Xaa Xaa Xaa Xaa Xaa Xaa Xaa
        2915                2920                2925

Xaa Xaa Xaa Xaa Xaa Xaa Xaa Xaa Xaa Xaa Xaa Xaa Xaa Xaa Xaa Xaa
    2930                2935                2940

Xaa Xaa Xaa Xaa Xaa Xaa Xaa Xaa Xaa Xaa Xaa Xaa Xaa Xaa Xaa Xaa
2945                2950                2955                2960

Xaa Xaa Xaa Xaa Xaa Xaa Xaa Xaa Xaa Xaa Xaa Xaa Xaa Xaa Xaa Xaa
                2965                2970                2975

Xaa Xaa Xaa Xaa Xaa Xaa Xaa Xaa Xaa Xaa Xaa Xaa Xaa Xaa Xaa Xaa
            2980                2985                2990

Xaa Xaa Xaa Xaa Xaa Xaa Xaa Xaa Xaa Xaa Xaa Xaa Xaa Xaa Xaa Xaa
        2995                3000                3005

Xaa Xaa Xaa Xaa Xaa Xaa Xaa Xaa Xaa Xaa Xaa Xaa Xaa Xaa Xaa Xaa
    3010                3015                3020

Xaa Xaa Xaa Xaa Xaa Xaa Xaa Xaa Xaa Xaa Xaa Xaa Xaa Xaa Xaa Xaa
3025                3030                3035                3040

Xaa Xaa Xaa Xaa Xaa Xaa Xaa Xaa Xaa Xaa Xaa Xaa Xaa Xaa Xaa Xaa
                3045                3050                3055

Xaa Xaa Xaa Xaa Xaa Xaa Xaa Xaa Xaa Xaa Xaa Xaa Xaa Xaa Xaa Xaa
            3060                3065                3070

Xaa Xaa Xaa Xaa Xaa Xaa Xaa Xaa Xaa Xaa Xaa Xaa Xaa Xaa Xaa Xaa
        3075                3080                3085

Xaa Xaa Xaa Xaa Xaa Xaa Xaa Xaa Xaa Xaa Xaa Xaa Xaa Xaa Xaa Xaa
    3090                3095                3100

Xaa Xaa Xaa Xaa Xaa Xaa Xaa Xaa Xaa Xaa Xaa Xaa Xaa Xaa Xaa Xaa
3105                3110                3115                3120

Xaa Xaa Xaa Xaa Xaa Xaa Xaa Xaa Xaa Xaa Xaa Xaa Xaa Xaa Xaa Xaa
                3125                3130                3135

Xaa Xaa Xaa Xaa Xaa Xaa Xaa Xaa Xaa Xaa Xaa Xaa Xaa Xaa Xaa Xaa
            3140                3145                3150

Xaa Xaa Xaa Xaa Xaa Xaa Xaa Xaa Xaa Xaa Xaa Xaa Xaa Xaa Xaa Xaa
        3155                3160                3165

Xaa Xaa Xaa Xaa Xaa Xaa Xaa Xaa Xaa Xaa Xaa Xaa Xaa Xaa Xaa Xaa
    3170                3175                3180

Xaa Xaa Xaa Xaa Xaa Xaa Xaa Xaa Xaa Xaa Xaa Xaa Xaa Xaa Xaa Xaa
3185                3190                3195                3200

Xaa Xaa Xaa Xaa Xaa Xaa Xaa Xaa Xaa Xaa Xaa Xaa Xaa Xaa Xaa Xaa
                3205                3210                3215

Xaa Xaa Xaa Xaa Xaa Xaa Xaa Xaa Xaa Xaa Xaa Xaa Xaa Xaa Xaa Xaa
            3220                3225                3230

Xaa Xaa Xaa Xaa Xaa Xaa Xaa Xaa Xaa Xaa Xaa Xaa Xaa Xaa Xaa Xaa
        3235                3240                3245

Xaa Xaa Xaa Xaa Xaa Xaa Xaa Xaa Xaa Xaa Xaa Xaa Xaa Xaa Xaa Xaa
    3250                3255                3260

Xaa Xaa Xaa Xaa Xaa Xaa Xaa Xaa Xaa Xaa Xaa Xaa Xaa Xaa Xaa Xaa
3265                3270                3275                3280
```

Xaa Xaa Xaa Xaa Xaa Xaa Xaa Xaa Xaa Xaa Xaa Xaa Xaa Xaa Xaa Xaa
3285 3290 3295

Xaa Xaa Xaa Xaa Xaa Xaa Xaa Xaa Xaa Xaa Xaa Xaa Xaa Xaa Xaa Xaa
3300 3305 3310

Xaa Xaa Xaa Xaa Xaa Xaa Xaa Xaa Xaa Xaa Xaa Xaa Xaa Xaa Xaa Xaa
3315 3320 3325

Xaa Xaa Xaa Xaa Xaa Xaa Xaa Xaa Xaa Xaa Xaa Xaa Xaa Xaa Xaa Xaa
3330 3335 3340

Xaa Xaa Xaa Xaa Xaa Xaa Xaa Xaa Xaa Xaa Xaa Xaa Xaa Xaa Xaa Xaa
3345 3350 3355 3360

Xaa Xaa Xaa Xaa Xaa Xaa Xaa Xaa Xaa Xaa Xaa Xaa Xaa Xaa Xaa Xaa
3365 3370 3375

Xaa Xaa Xaa Xaa Xaa Xaa Xaa Xaa Xaa Xaa Xaa Xaa Xaa Xaa Xaa Xaa
3380 3385 3390

Xaa Xaa Xaa Xaa Xaa Xaa Xaa Xaa Xaa Xaa Xaa Xaa Xaa Xaa Xaa Xaa
3395 3400 3405

Xaa Xaa Xaa Xaa Xaa Xaa Xaa Xaa Xaa Xaa Xaa Xaa Xaa Xaa Xaa Xaa
3410 3415 3420

Xaa Xaa Xaa Xaa Xaa Xaa Xaa Xaa Xaa Xaa Xaa Xaa Xaa Xaa Xaa Xaa
3425 3430 3435 3440

Xaa Xaa Xaa Xaa Xaa Xaa Xaa Xaa Xaa Xaa Xaa Xaa Xaa Xaa Xaa Xaa
3445 3450 3455

Xaa Xaa Xaa Xaa Xaa Xaa Xaa Xaa Xaa Xaa Xaa Xaa Xaa Xaa Xaa Xaa
3460 3465 3470

Xaa Xaa Xaa Xaa Xaa Xaa Xaa Xaa Xaa Xaa Xaa Xaa Xaa Xaa Xaa Xaa
3475 3480 3485

Xaa Xaa Xaa Xaa Xaa Xaa Xaa Xaa Xaa Xaa Xaa Xaa Xaa Xaa Xaa Xaa
3490 3495 3500

Xaa Xaa Xaa Xaa Xaa Xaa Xaa Xaa Xaa Xaa Xaa Xaa Xaa Xaa Xaa Xaa
3505 3510 3515 3520

Xaa Xaa Xaa Xaa Xaa Xaa Xaa Xaa Xaa Xaa Xaa Xaa Xaa Xaa Xaa Xaa
3525 3530 3535

Xaa Xaa Xaa Xaa Xaa Xaa Xaa Xaa Xaa Xaa Xaa Xaa Xaa Xaa Xaa Xaa
3540 3545 3550

Xaa Xaa Xaa Xaa Xaa Xaa Xaa Xaa Xaa Xaa Xaa Xaa Xaa Xaa Xaa Xaa
3555 3560 3565

Xaa Xaa Xaa Xaa Xaa Xaa Xaa Xaa Xaa Xaa Xaa Xaa Xaa Xaa Xaa Xaa
3570 3575 3580

Xaa Xaa Xaa Xaa Xaa Xaa Xaa Xaa Xaa Xaa Xaa Xaa Xaa Xaa Xaa Xaa
3585 3590 3595 3600

Xaa Xaa Xaa Xaa Xaa Xaa Xaa Xaa Xaa Xaa Xaa Xaa Xaa Xaa Xaa Xaa
3605 3610 3615

Xaa Xaa Xaa Xaa Xaa Xaa Xaa Xaa Xaa Xaa Xaa Xaa Xaa Xaa Xaa Xaa
3620 3625 3630

Xaa Xaa Xaa Xaa Xaa Xaa Xaa Xaa Xaa Xaa Xaa Xaa Xaa Xaa Xaa Xaa
3635 3640 3645

Xaa Xaa Xaa Xaa Xaa Xaa Xaa Xaa Xaa Xaa Xaa Xaa Xaa Xaa Xaa Xaa
3650 3655 3660

Xaa Xaa Xaa Xaa Xaa Xaa Xaa Xaa Xaa Xaa Xaa Xaa Xaa Xaa Xaa Xaa
3665 3670 3675 3680

Xaa Xaa Xaa Xaa Xaa Xaa Xaa Xaa Xaa Xaa Xaa Xaa Xaa Xaa Xaa Xaa
3685 3690 3695

Xaa Xaa Xaa Xaa Xaa Xaa Xaa Xaa Xaa Xaa Xaa Xaa Xaa Xaa Xaa Xaa
3700 3705 3710

```
Xaa Xaa Xaa Xaa Xaa Xaa Xaa Xaa Xaa Xaa Xaa Xaa Xaa Xaa Xaa Xaa
        3715                3720                3725

Xaa Xaa Xaa Xaa Xaa Xaa Xaa Xaa Xaa Xaa Xaa Xaa Xaa Xaa Xaa Xaa
    3730                3735                3740

Xaa Xaa Xaa Xaa Xaa Xaa Xaa Xaa Xaa Xaa Xaa Xaa Xaa Xaa Xaa Xaa
3745                3750                3755                3760

Xaa Xaa Xaa Xaa Xaa Xaa Xaa Xaa Xaa Xaa Xaa Xaa Xaa Xaa Xaa Xaa
                3765                3770                3775

Xaa Xaa Xaa Xaa Xaa Xaa Xaa Xaa Xaa Xaa Xaa Xaa Xaa Xaa Xaa Xaa
            3780                3785                3790

Xaa Xaa Xaa Xaa Xaa Xaa Xaa Xaa Xaa Xaa Xaa Xaa Xaa Xaa Xaa Xaa
        3795                3800                3805

Xaa Xaa Xaa Xaa Xaa Xaa Xaa Xaa Xaa Xaa Xaa Xaa Xaa Xaa Xaa Xaa
    3810                3815                3820

Xaa Xaa Xaa Xaa Xaa Xaa Xaa Xaa Xaa Xaa Xaa Xaa Xaa Xaa Xaa Xaa
3825                3830                3835                3840

Xaa Xaa Xaa Xaa Xaa Xaa Xaa Xaa Xaa Xaa Xaa Xaa Xaa Xaa Xaa Xaa
                3845                3850                3855

Xaa Xaa Xaa Xaa Xaa Xaa Xaa Xaa Xaa Xaa Xaa Xaa Xaa Xaa Xaa Xaa
            3860                3865                3870

Xaa Xaa Xaa Xaa Xaa Xaa Xaa Xaa Xaa Xaa Xaa Xaa Xaa Xaa Xaa Xaa
        3875                3880                3885

Xaa Xaa Xaa Xaa Xaa Xaa Xaa Xaa Xaa Xaa Xaa Xaa Xaa Xaa Xaa Xaa
    3890                3895                3900

Xaa Xaa Xaa Xaa Xaa Xaa Xaa Xaa Xaa Xaa Xaa Xaa Xaa Xaa Xaa Xaa
3905                3910                3915                3920

Xaa Xaa Xaa Xaa Xaa Xaa Xaa Xaa Xaa Xaa Xaa Xaa Xaa Xaa Xaa Xaa
                3925                3930                3935

Xaa Xaa Xaa Xaa Xaa Xaa Xaa Xaa Xaa Xaa Xaa Xaa Xaa Xaa Xaa Xaa
            3940                3945                3950

Xaa Xaa Xaa Xaa Xaa Xaa Xaa Xaa Xaa Xaa Xaa Xaa Xaa Xaa Xaa Xaa
        3955                3960                3965

Xaa Xaa Xaa Xaa Xaa Xaa Xaa Xaa Xaa Xaa Xaa Xaa Xaa Xaa Xaa Xaa
    3970                3975                3980

Xaa Xaa Xaa Xaa Xaa Xaa Xaa Xaa Xaa Xaa Xaa Xaa Xaa Xaa Xaa Xaa
3985                3990                3995                4000

Xaa Xaa Xaa Xaa Xaa Xaa Xaa Xaa Xaa Xaa Xaa Xaa Xaa Xaa Xaa Xaa
                4005                4010                4015

Xaa Xaa Xaa Xaa Xaa Xaa Xaa Xaa Xaa Xaa Xaa Xaa Xaa Xaa Xaa Xaa
            4020                4025                4030

Xaa Xaa Xaa Xaa Xaa Xaa Xaa Xaa Xaa Xaa Xaa Xaa Xaa Xaa Xaa Xaa
        4035                4040                4045

Xaa Xaa Xaa Xaa Xaa Xaa Xaa Xaa Xaa Xaa Xaa Xaa Xaa Xaa Xaa Xaa
    4050                4055                4060

Xaa Xaa Xaa Xaa Xaa Xaa Xaa Xaa Xaa Xaa Xaa Xaa Xaa Xaa Xaa Xaa
4065                4070                4075                4080

Xaa Xaa Xaa Xaa Xaa Xaa Xaa Xaa Xaa Xaa Xaa Xaa Xaa Xaa Xaa Xaa
                4085                4090                4095

Xaa Xaa Xaa Xaa Xaa Xaa Xaa Xaa Xaa Xaa
            4100                4105
```

<210> SEQ ID NO 2
<211> LENGTH: 4368
<212> TYPE: PRT
<213> ORGANISM: Artificial

<220> FEATURE:
<223> OTHER INFORMATION: Exemplary sequence used to illustrate invention.
<220> FEATURE:
<221> NAME/KEY: REPEAT
<222> LOCATION: (1)..(2000)
<223> OTHER INFORMATION: Xaa is any amino acid and can be shown 1 to 2000 times.
<220> FEATURE:
<221> NAME/KEY: REPEAT
<222> LOCATION: (2002)..(2051)
<223> OTHER INFORMATION: Xaa is any amino acid and can be shown 1 to 50 times.
<220> FEATURE:
<221> NAME/KEY: REPEAT
<222> LOCATION: (2053)..(2057)
<223> OTHER INFORMATION: Xaa is any amino acid and can be shown 0 to 5 times.
<220> FEATURE:
<221> NAME/KEY: REPEAT
<222> LOCATION: (2059)..(2158)
<223> OTHER INFORMATION: Xaa is any amino acid and can be shown 1 to 100 times.
<220> FEATURE:
<221> NAME/KEY: REPEAT
<222> LOCATION: (2160)..(2259)
<223> OTHER INFORMATION: Xaa is any amino acid and can be shown 1 to 100 times.
<220> FEATURE:
<221> NAME/KEY: REPEAT
<222> LOCATION: (2261)..(2310)
<223> OTHER INFORMATION: Xaa is any amino acid and can be shown 1 to 50 times.
<220> FEATURE:
<221> NAME/KEY: REPEAT
<222> LOCATION: (2312)..(2316)
<223> OTHER INFORMATION: Xaa is any amino acid and can be shown 0 to 5 times.
<220> FEATURE:
<221> NAME/KEY: REPEAT
<222> LOCATION: (2318)..(2367)
<223> OTHER INFORMATION: Xaa is any amino acid and can be shown 1 to 50 times.
<220> FEATURE:
<221> NAME/KEY: REPEAT
<222> LOCATION: (2369)..(4368)
<223> OTHER INFORMATION: Xaa is any amino acid and can be shown 1 to 2000 times.

<400> SEQUENCE: 2

```
Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Xaa Xaa Xaa Xaa Xaa Xaa Xaa Xaa Xaa Xaa Xaa Xaa
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa Xaa Xaa Xaa
    130                 135                 140

Xaa Xaa Xaa Xaa Xaa Xaa Xaa Xaa Xaa Xaa Xaa Xaa Xaa Xaa Xaa Xaa
145                 150                 155                 160
```

-continued

```
Xaa Xaa Xaa Xaa Xaa Xaa Xaa Xaa Xaa Xaa Xaa Xaa Xaa Xaa Xaa Xaa
                165                 170                 175

Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Xaa Xaa Xaa Xaa Xaa Xaa Xaa Xaa Xaa Xaa Xaa Xaa Xaa Xaa Xaa Xaa
    210                 215                 220

Xaa Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa Xaa
                245                 250                 255

Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590
```

-continued

```
Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa Xaa
    690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815

Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa Xaa Xaa Xaa Xaa Xaa Xaa Xaa Xaa
        995                 1000                1005

Xaa Xaa Xaa Xaa Xaa Xaa Xaa Xaa Xaa Xaa Xaa Xaa Xaa Xaa Xaa Xaa
    1010                1015                1020
```

```
Xaa Xaa Xaa Xaa Xaa Xaa Xaa Xaa Xaa Xaa Xaa Xaa Xaa Xaa Xaa Xaa
1025                1030                1035                1040

Xaa Xaa Xaa Xaa Xaa Xaa Xaa Xaa Xaa Xaa Xaa Xaa Xaa Xaa Xaa Xaa
                1045                1050                1055

Xaa Xaa Xaa Xaa Xaa Xaa Xaa Xaa Xaa Xaa Xaa Xaa Xaa Xaa Xaa Xaa
            1060                1065                1070

Xaa Xaa Xaa Xaa Xaa Xaa Xaa Xaa Xaa Xaa Xaa Xaa Xaa Xaa Xaa Xaa
        1075                1080                1085

Xaa Xaa Xaa Xaa Xaa Xaa Xaa Xaa Xaa Xaa Xaa Xaa Xaa Xaa Xaa Xaa
    1090                1095                1100

Xaa Xaa Xaa Xaa Xaa Xaa Xaa Xaa Xaa Xaa Xaa Xaa Xaa Xaa Xaa Xaa
1105                1110                1115                1120

Xaa Xaa Xaa Xaa Xaa Xaa Xaa Xaa Xaa Xaa Xaa Xaa Xaa Xaa Xaa Xaa
                1125                1130                1135

Xaa Xaa Xaa Xaa Xaa Xaa Xaa Xaa Xaa Xaa Xaa Xaa Xaa Xaa Xaa Xaa
            1140                1145                1150

Xaa Xaa Xaa Xaa Xaa Xaa Xaa Xaa Xaa Xaa Xaa Xaa Xaa Xaa Xaa Xaa
        1155                1160                1165

Xaa Xaa Xaa Xaa Xaa Xaa Xaa Xaa Xaa Xaa Xaa Xaa Xaa Xaa Xaa Xaa
    1170                1175                1180

Xaa Xaa Xaa Xaa Xaa Xaa Xaa Xaa Xaa Xaa Xaa Xaa Xaa Xaa Xaa Xaa
1185                1190                1195                1200

Xaa Xaa Xaa Xaa Xaa Xaa Xaa Xaa Xaa Xaa Xaa Xaa Xaa Xaa Xaa Xaa
                1205                1210                1215

Xaa Xaa Xaa Xaa Xaa Xaa Xaa Xaa Xaa Xaa Xaa Xaa Xaa Xaa Xaa Xaa
            1220                1225                1230

Xaa Xaa Xaa Xaa Xaa Xaa Xaa Xaa Xaa Xaa Xaa Xaa Xaa Xaa Xaa Xaa
        1235                1240                1245

Xaa Xaa Xaa Xaa Xaa Xaa Xaa Xaa Xaa Xaa Xaa Xaa Xaa Xaa Xaa Xaa
    1250                1255                1260

Xaa Xaa Xaa Xaa Xaa Xaa Xaa Xaa Xaa Xaa Xaa Xaa Xaa Xaa Xaa Xaa
1265                1270                1275                1280

Xaa Xaa Xaa Xaa Xaa Xaa Xaa Xaa Xaa Xaa Xaa Xaa Xaa Xaa Xaa Xaa
                1285                1290                1295

Xaa Xaa Xaa Xaa Xaa Xaa Xaa Xaa Xaa Xaa Xaa Xaa Xaa Xaa Xaa Xaa
            1300                1305                1310

Xaa Xaa Xaa Xaa Xaa Xaa Xaa Xaa Xaa Xaa Xaa Xaa Xaa Xaa Xaa Xaa
        1315                1320                1325

Xaa Xaa Xaa Xaa Xaa Xaa Xaa Xaa Xaa Xaa Xaa Xaa Xaa Xaa Xaa Xaa
    1330                1335                1340

Xaa Xaa Xaa Xaa Xaa Xaa Xaa Xaa Xaa Xaa Xaa Xaa Xaa Xaa Xaa Xaa
1345                1350                1355                1360

Xaa Xaa Xaa Xaa Xaa Xaa Xaa Xaa Xaa Xaa Xaa Xaa Xaa Xaa Xaa Xaa
                1365                1370                1375

Xaa Xaa Xaa Xaa Xaa Xaa Xaa Xaa Xaa Xaa Xaa Xaa Xaa Xaa Xaa Xaa
            1380                1385                1390

Xaa Xaa Xaa Xaa Xaa Xaa Xaa Xaa Xaa Xaa Xaa Xaa Xaa Xaa Xaa Xaa
        1395                1400                1405

Xaa Xaa Xaa Xaa Xaa Xaa Xaa Xaa Xaa Xaa Xaa Xaa Xaa Xaa Xaa Xaa
    1410                1415                1420

Xaa Xaa Xaa Xaa Xaa Xaa Xaa Xaa Xaa Xaa Xaa Xaa Xaa Xaa Xaa Xaa
1425                1430                1435                1440

Xaa Xaa Xaa Xaa Xaa Xaa Xaa Xaa Xaa Xaa Xaa Xaa Xaa Xaa Xaa Xaa
                1445                1450                1455
```

```
Xaa Xaa Xaa Xaa Xaa Xaa Xaa Xaa Xaa Xaa Xaa Xaa Xaa Xaa Xaa Xaa
            1460                1465                1470

Xaa Xaa Xaa Xaa Xaa Xaa Xaa Xaa Xaa Xaa Xaa Xaa Xaa Xaa Xaa Xaa
        1475                1480                1485

Xaa Xaa Xaa Xaa Xaa Xaa Xaa Xaa Xaa Xaa Xaa Xaa Xaa Xaa Xaa Xaa
    1490                1495                1500

Xaa Xaa Xaa Xaa Xaa Xaa Xaa Xaa Xaa Xaa Xaa Xaa Xaa Xaa Xaa Xaa
1505                1510                1515                1520

Xaa Xaa Xaa Xaa Xaa Xaa Xaa Xaa Xaa Xaa Xaa Xaa Xaa Xaa Xaa Xaa
                1525                1530                1535

Xaa Xaa Xaa Xaa Xaa Xaa Xaa Xaa Xaa Xaa Xaa Xaa Xaa Xaa Xaa Xaa
            1540                1545                1550

Xaa Xaa Xaa Xaa Xaa Xaa Xaa Xaa Xaa Xaa Xaa Xaa Xaa Xaa Xaa Xaa
        1555                1560                1565

Xaa Xaa Xaa Xaa Xaa Xaa Xaa Xaa Xaa Xaa Xaa Xaa Xaa Xaa Xaa Xaa
    1570                1575                1580

Xaa Xaa Xaa Xaa Xaa Xaa Xaa Xaa Xaa Xaa Xaa Xaa Xaa Xaa Xaa Xaa
1585                1590                1595                1600

Xaa Xaa Xaa Xaa Xaa Xaa Xaa Xaa Xaa Xaa Xaa Xaa Xaa Xaa Xaa Xaa
                1605                1610                1615

Xaa Xaa Xaa Xaa Xaa Xaa Xaa Xaa Xaa Xaa Xaa Xaa Xaa Xaa Xaa Xaa
            1620                1625                1630

Xaa Xaa Xaa Xaa Xaa Xaa Xaa Xaa Xaa Xaa Xaa Xaa Xaa Xaa Xaa Xaa
        1635                1640                1645

Xaa Xaa Xaa Xaa Xaa Xaa Xaa Xaa Xaa Xaa Xaa Xaa Xaa Xaa Xaa Xaa
    1650                1655                1660

Xaa Xaa Xaa Xaa Xaa Xaa Xaa Xaa Xaa Xaa Xaa Xaa Xaa Xaa Xaa Xaa
1665                1670                1675                1680

Xaa Xaa Xaa Xaa Xaa Xaa Xaa Xaa Xaa Xaa Xaa Xaa Xaa Xaa Xaa Xaa
                1685                1690                1695

Xaa Xaa Xaa Xaa Xaa Xaa Xaa Xaa Xaa Xaa Xaa Xaa Xaa Xaa Xaa Xaa
            1700                1705                1710

Xaa Xaa Xaa Xaa Xaa Xaa Xaa Xaa Xaa Xaa Xaa Xaa Xaa Xaa Xaa Xaa
        1715                1720                1725

Xaa Xaa Xaa Xaa Xaa Xaa Xaa Xaa Xaa Xaa Xaa Xaa Xaa Xaa Xaa Xaa
    1730                1735                1740

Xaa Xaa Xaa Xaa Xaa Xaa Xaa Xaa Xaa Xaa Xaa Xaa Xaa Xaa Xaa Xaa
1745                1750                1755                1760

Xaa Xaa Xaa Xaa Xaa Xaa Xaa Xaa Xaa Xaa Xaa Xaa Xaa Xaa Xaa Xaa
                1765                1770                1775

Xaa Xaa Xaa Xaa Xaa Xaa Xaa Xaa Xaa Xaa Xaa Xaa Xaa Xaa Xaa Xaa
            1780                1785                1790

Xaa Xaa Xaa Xaa Xaa Xaa Xaa Xaa Xaa Xaa Xaa Xaa Xaa Xaa Xaa Xaa
        1795                1800                1805

Xaa Xaa Xaa Xaa Xaa Xaa Xaa Xaa Xaa Xaa Xaa Xaa Xaa Xaa Xaa Xaa
    1810                1815                1820

Xaa Xaa Xaa Xaa Xaa Xaa Xaa Xaa Xaa Xaa Xaa Xaa Xaa Xaa Xaa Xaa
1825                1830                1835                1840

Xaa Xaa Xaa Xaa Xaa Xaa Xaa Xaa Xaa Xaa Xaa Xaa Xaa Xaa Xaa Xaa
                1845                1850                1855

Xaa Xaa Xaa Xaa Xaa Xaa Xaa Xaa Xaa Xaa Xaa Xaa Xaa Xaa Xaa Xaa
            1860                1865                1870

Xaa Xaa Xaa Xaa Xaa Xaa Xaa Xaa Xaa Xaa Xaa Xaa Xaa Xaa Xaa Xaa
        1875                1880                1885
```

-continued

Xaa Xaa Xaa Xaa Xaa Xaa Xaa Xaa Xaa Xaa Xaa Xaa Xaa Xaa Xaa Xaa
    1890                1895                1900

Xaa Xaa Xaa Xaa Xaa Xaa Xaa Xaa Xaa Xaa Xaa Xaa Xaa Xaa Xaa Xaa
1905                1910                1915                1920

Xaa Xaa Xaa Xaa Xaa Xaa Xaa Xaa Xaa Xaa Xaa Xaa Xaa Xaa Xaa Xaa
                1925                1930                1935

Xaa Xaa Xaa Xaa Xaa Xaa Xaa Xaa Xaa Xaa Xaa Xaa Xaa Xaa Xaa Xaa
            1940                1945                1950

Xaa Xaa Xaa Xaa Xaa Xaa Xaa Xaa Xaa Xaa Xaa Xaa Xaa Xaa Xaa Xaa
        1955                1960                1965

Xaa Xaa Xaa Xaa Xaa Xaa Xaa Xaa Xaa Xaa Xaa Xaa Xaa Xaa Xaa Xaa
    1970                1975                1980

Xaa Xaa Xaa Xaa Xaa Xaa Xaa Xaa Xaa Xaa Xaa Xaa Xaa Xaa Xaa Xaa
1985                1990                1995                2000

Cys Xaa Xaa Xaa Xaa Xaa Xaa Xaa Xaa Xaa Xaa Xaa Xaa Xaa Xaa Xaa
                2005                2010                2015

Xaa Xaa Xaa Xaa Xaa Xaa Xaa Xaa Xaa Xaa Xaa Xaa Xaa Xaa Xaa Xaa
            2020                2025                2030

Xaa Xaa Xaa Xaa Xaa Xaa Xaa Xaa Xaa Xaa Xaa Xaa Xaa Xaa Xaa Xaa
        2035                2040                2045

Xaa Xaa Xaa Cys Xaa Xaa Xaa Xaa Xaa Cys Xaa Xaa Xaa Xaa Xaa Xaa
    2050                2055                2060

Xaa Xaa Xaa Xaa Xaa Xaa Xaa Xaa Xaa Xaa Xaa Xaa Xaa Xaa Xaa Xaa
2065                2070                2075                2080

Xaa Xaa Xaa Xaa Xaa Xaa Xaa Xaa Xaa Xaa Xaa Xaa Xaa Xaa Xaa Xaa
                2085                2090                2095

Xaa Xaa Xaa Xaa Xaa Xaa Xaa Xaa Xaa Xaa Xaa Xaa Xaa Xaa Xaa Xaa
            2100                2105                2110

Xaa Xaa Xaa Xaa Xaa Xaa Xaa Xaa Xaa Xaa Xaa Xaa Xaa Xaa Xaa Xaa
        2115                2120                2125

Xaa Xaa Xaa Xaa Xaa Xaa Xaa Xaa Xaa Xaa Xaa Xaa Xaa Xaa Xaa Xaa
    2130                2135                2140

Xaa Xaa Xaa Xaa Xaa Xaa Xaa Xaa Xaa Xaa Xaa Xaa Xaa Xaa Cys Xaa
2145                2150                2155                2160

Xaa Xaa Xaa Xaa Xaa Xaa Xaa Xaa Xaa Xaa Xaa Xaa Xaa Xaa Xaa Xaa
                2165                2170                2175

Xaa Xaa Xaa Xaa Xaa Xaa Xaa Xaa Xaa Xaa Xaa Xaa Xaa Xaa Xaa Xaa
            2180                2185                2190

Xaa Xaa Xaa Xaa Xaa Xaa Xaa Xaa Xaa Xaa Xaa Xaa Xaa Xaa Xaa Xaa
        2195                2200                2205

Xaa Xaa Xaa Xaa Xaa Xaa Xaa Xaa Xaa Xaa Xaa Xaa Xaa Xaa Xaa Xaa
    2210                2215                2220

Xaa Xaa Xaa Xaa Xaa Xaa Xaa Xaa Xaa Xaa Xaa Xaa Xaa Xaa Xaa Xaa
2225                2230                2235                2240

Xaa Xaa Xaa Xaa Xaa Xaa Xaa Xaa Xaa Xaa Xaa Xaa Xaa Xaa Xaa Xaa
                2245                2250                2255

Xaa Xaa Xaa Cys Xaa Xaa Xaa Xaa Xaa Xaa Xaa Xaa Xaa Xaa Xaa Xaa
            2260                2265                2270

Xaa Xaa Xaa Xaa Xaa Xaa Xaa Xaa Xaa Xaa Xaa Xaa Xaa Xaa Xaa Xaa
        2275                2280                2285

Xaa Xaa Xaa Xaa Xaa Xaa Xaa Xaa Xaa Xaa Xaa Xaa Xaa Xaa Xaa Xaa
    2290                2295                2300

Xaa Xaa Xaa Xaa Xaa Xaa Cys Xaa Xaa Xaa Xaa Xaa Cys Xaa Xaa Xaa
2305                2310                2315                2320

```
Xaa Xaa Xaa Xaa Xaa Xaa Xaa Xaa Xaa Xaa Xaa Xaa Xaa Xaa Xaa Xaa
                2325                2330                2335

Xaa Xaa Xaa Xaa Xaa Xaa Xaa Xaa Xaa Xaa Xaa Xaa Xaa Xaa Xaa Xaa
            2340                2345                2350

Xaa Xaa Xaa Xaa Xaa Xaa Xaa Xaa Xaa Xaa Xaa Xaa Xaa Xaa Xaa Cys
        2355                2360                2365

Xaa Xaa Xaa Xaa Xaa Xaa Xaa Xaa Xaa Xaa Xaa Xaa Xaa Xaa Xaa Xaa
    2370                2375                2380

Xaa Xaa Xaa Xaa Xaa Xaa Xaa Xaa Xaa Xaa Xaa Xaa Xaa Xaa Xaa Xaa
2385                2390                2395                2400

Xaa Xaa Xaa Xaa Xaa Xaa Xaa Xaa Xaa Xaa Xaa Xaa Xaa Xaa Xaa Xaa
                2405                2410                2415

Xaa Xaa Xaa Xaa Xaa Xaa Xaa Xaa Xaa Xaa Xaa Xaa Xaa Xaa Xaa Xaa
            2420                2425                2430

Xaa Xaa Xaa Xaa Xaa Xaa Xaa Xaa Xaa Xaa Xaa Xaa Xaa Xaa Xaa Xaa
        2435                2440                2445

Xaa Xaa Xaa Xaa Xaa Xaa Xaa Xaa Xaa Xaa Xaa Xaa Xaa Xaa Xaa Xaa
    2450                2455                2460

Xaa Xaa Xaa Xaa Xaa Xaa Xaa Xaa Xaa Xaa Xaa Xaa Xaa Xaa Xaa Xaa
2465                2470                2475                2480

Xaa Xaa Xaa Xaa Xaa Xaa Xaa Xaa Xaa Xaa Xaa Xaa Xaa Xaa Xaa Xaa
                2485                2490                2495

Xaa Xaa Xaa Xaa Xaa Xaa Xaa Xaa Xaa Xaa Xaa Xaa Xaa Xaa Xaa Xaa
            2500                2505                2510

Xaa Xaa Xaa Xaa Xaa Xaa Xaa Xaa Xaa Xaa Xaa Xaa Xaa Xaa Xaa Xaa
        2515                2520                2525

Xaa Xaa Xaa Xaa Xaa Xaa Xaa Xaa Xaa Xaa Xaa Xaa Xaa Xaa Xaa Xaa
    2530                2535                2540

Xaa Xaa Xaa Xaa Xaa Xaa Xaa Xaa Xaa Xaa Xaa Xaa Xaa Xaa Xaa Xaa
2545                2550                2555                2560

Xaa Xaa Xaa Xaa Xaa Xaa Xaa Xaa Xaa Xaa Xaa Xaa Xaa Xaa Xaa Xaa
                2565                2570                2575

Xaa Xaa Xaa Xaa Xaa Xaa Xaa Xaa Xaa Xaa Xaa Xaa Xaa Xaa Xaa Xaa
           2580                 2585                2590

Xaa Xaa Xaa Xaa Xaa Xaa Xaa Xaa Xaa Xaa Xaa Xaa Xaa Xaa Xaa Xaa
        2595                2600                2605

Xaa Xaa Xaa Xaa Xaa Xaa Xaa Xaa Xaa Xaa Xaa Xaa Xaa Xaa Xaa Xaa
    2610                2615                2620

Xaa Xaa Xaa Xaa Xaa Xaa Xaa Xaa Xaa Xaa Xaa Xaa Xaa Xaa Xaa Xaa
2625                2630                2635                2640

Xaa Xaa Xaa Xaa Xaa Xaa Xaa Xaa Xaa Xaa Xaa Xaa Xaa Xaa Xaa Xaa
                2645                2650                2655

Xaa Xaa Xaa Xaa Xaa Xaa Xaa Xaa Xaa Xaa Xaa Xaa Xaa Xaa Xaa Xaa
            2660                2665                2670

Xaa Xaa Xaa Xaa Xaa Xaa Xaa Xaa Xaa Xaa Xaa Xaa Xaa Xaa Xaa Xaa
        2675                2680                2685

Xaa Xaa Xaa Xaa Xaa Xaa Xaa Xaa Xaa Xaa Xaa Xaa Xaa Xaa Xaa Xaa
    2690                2695                2700

Xaa Xaa Xaa Xaa Xaa Xaa Xaa Xaa Xaa Xaa Xaa Xaa Xaa Xaa Xaa Xaa
2705                2710                2715                2720

Xaa Xaa Xaa Xaa Xaa Xaa Xaa Xaa Xaa Xaa Xaa Xaa Xaa Xaa Xaa Xaa
                2725                2730                2735

Xaa Xaa Xaa Xaa Xaa Xaa Xaa Xaa Xaa Xaa Xaa Xaa Xaa Xaa Xaa Xaa
            2740                2745                2750
```

-continued

```
Xaa Xaa Xaa Xaa Xaa Xaa Xaa Xaa Xaa Xaa Xaa Xaa Xaa Xaa Xaa Xaa
        2755                2760                2765

Xaa Xaa Xaa Xaa Xaa Xaa Xaa Xaa Xaa Xaa Xaa Xaa Xaa Xaa Xaa Xaa
    2770                2775                2780

Xaa Xaa Xaa Xaa Xaa Xaa Xaa Xaa Xaa Xaa Xaa Xaa Xaa Xaa Xaa Xaa
2785                2790                2795                2800

Xaa Xaa Xaa Xaa Xaa Xaa Xaa Xaa Xaa Xaa Xaa Xaa Xaa Xaa Xaa Xaa
                2805                2810                2815

Xaa Xaa Xaa Xaa Xaa Xaa Xaa Xaa Xaa Xaa Xaa Xaa Xaa Xaa Xaa Xaa
            2820                2825                2830

Xaa Xaa Xaa Xaa Xaa Xaa Xaa Xaa Xaa Xaa Xaa Xaa Xaa Xaa Xaa Xaa
        2835                2840                2845

Xaa Xaa Xaa Xaa Xaa Xaa Xaa Xaa Xaa Xaa Xaa Xaa Xaa Xaa Xaa Xaa
    2850                2855                2860

Xaa Xaa Xaa Xaa Xaa Xaa Xaa Xaa Xaa Xaa Xaa Xaa Xaa Xaa Xaa Xaa
2865                2870                2875                2880

Xaa Xaa Xaa Xaa Xaa Xaa Xaa Xaa Xaa Xaa Xaa Xaa Xaa Xaa Xaa Xaa
                2885                2890                2895

Xaa Xaa Xaa Xaa Xaa Xaa Xaa Xaa Xaa Xaa Xaa Xaa Xaa Xaa Xaa Xaa
            2900                2905                2910

Xaa Xaa Xaa Xaa Xaa Xaa Xaa Xaa Xaa Xaa Xaa Xaa Xaa Xaa Xaa Xaa
        2915                2920                2925

Xaa Xaa Xaa Xaa Xaa Xaa Xaa Xaa Xaa Xaa Xaa Xaa Xaa Xaa Xaa Xaa
    2930                2935                2940

Xaa Xaa Xaa Xaa Xaa Xaa Xaa Xaa Xaa Xaa Xaa Xaa Xaa Xaa Xaa Xaa
2945                2950                2955                2960

Xaa Xaa Xaa Xaa Xaa Xaa Xaa Xaa Xaa Xaa Xaa Xaa Xaa Xaa Xaa Xaa
                2965                2970                2975

Xaa Xaa Xaa Xaa Xaa Xaa Xaa Xaa Xaa Xaa Xaa Xaa Xaa Xaa Xaa Xaa
            2980                2985                2990

Xaa Xaa Xaa Xaa Xaa Xaa Xaa Xaa Xaa Xaa Xaa Xaa Xaa Xaa Xaa Xaa
        2995                3000                3005

Xaa Xaa Xaa Xaa Xaa Xaa Xaa Xaa Xaa Xaa Xaa Xaa Xaa Xaa Xaa Xaa
    3010                3015                3020

Xaa Xaa Xaa Xaa Xaa Xaa Xaa Xaa Xaa Xaa Xaa Xaa Xaa Xaa Xaa Xaa
3025                3030                3035                3040

Xaa Xaa Xaa Xaa Xaa Xaa Xaa Xaa Xaa Xaa Xaa Xaa Xaa Xaa Xaa Xaa
                3045                3050                3055

Xaa Xaa Xaa Xaa Xaa Xaa Xaa Xaa Xaa Xaa Xaa Xaa Xaa Xaa Xaa Xaa
            3060                3065                3070

Xaa Xaa Xaa Xaa Xaa Xaa Xaa Xaa Xaa Xaa Xaa Xaa Xaa Xaa Xaa Xaa
        3075                3080                3085

Xaa Xaa Xaa Xaa Xaa Xaa Xaa Xaa Xaa Xaa Xaa Xaa Xaa Xaa Xaa Xaa
    3090                3095                3100

Xaa Xaa Xaa Xaa Xaa Xaa Xaa Xaa Xaa Xaa Xaa Xaa Xaa Xaa Xaa Xaa
3105                3110                3115                3120

Xaa Xaa Xaa Xaa Xaa Xaa Xaa Xaa Xaa Xaa Xaa Xaa Xaa Xaa Xaa Xaa
                3125                3130                3135

Xaa Xaa Xaa Xaa Xaa Xaa Xaa Xaa Xaa Xaa Xaa Xaa Xaa Xaa Xaa Xaa
            3140                3145                3150

Xaa Xaa Xaa Xaa Xaa Xaa Xaa Xaa Xaa Xaa Xaa Xaa Xaa Xaa Xaa Xaa
        3155                3160                3165

Xaa Xaa Xaa Xaa Xaa Xaa Xaa Xaa Xaa Xaa Xaa Xaa Xaa Xaa Xaa Xaa
    3170                3175                3180
```

-continued

```
Xaa Xaa Xaa Xaa Xaa Xaa Xaa Xaa Xaa Xaa Xaa Xaa Xaa Xaa Xaa Xaa
3185                3190                3195                3200

Xaa Xaa Xaa Xaa Xaa Xaa Xaa Xaa Xaa Xaa Xaa Xaa Xaa Xaa Xaa Xaa
                3205                3210                3215

Xaa Xaa Xaa Xaa Xaa Xaa Xaa Xaa Xaa Xaa Xaa Xaa Xaa Xaa Xaa Xaa
            3220                3225                3230

Xaa Xaa Xaa Xaa Xaa Xaa Xaa Xaa Xaa Xaa Xaa Xaa Xaa Xaa Xaa Xaa
        3235                3240                3245

Xaa Xaa Xaa Xaa Xaa Xaa Xaa Xaa Xaa Xaa Xaa Xaa Xaa Xaa Xaa Xaa
    3250                3255                3260

Xaa Xaa Xaa Xaa Xaa Xaa Xaa Xaa Xaa Xaa Xaa Xaa Xaa Xaa Xaa Xaa
3265                3270                3275                3280

Xaa Xaa Xaa Xaa Xaa Xaa Xaa Xaa Xaa Xaa Xaa Xaa Xaa Xaa Xaa Xaa
                3285                3290                3295

Xaa Xaa Xaa Xaa Xaa Xaa Xaa Xaa Xaa Xaa Xaa Xaa Xaa Xaa Xaa Xaa
            3300                3305                3310

Xaa Xaa Xaa Xaa Xaa Xaa Xaa Xaa Xaa Xaa Xaa Xaa Xaa Xaa Xaa Xaa
        3315                3320                3325

Xaa Xaa Xaa Xaa Xaa Xaa Xaa Xaa Xaa Xaa Xaa Xaa Xaa Xaa Xaa Xaa
    3330                3335                3340

Xaa Xaa Xaa Xaa Xaa Xaa Xaa Xaa Xaa Xaa Xaa Xaa Xaa Xaa Xaa Xaa
3345                3350                3355                3360

Xaa Xaa Xaa Xaa Xaa Xaa Xaa Xaa Xaa Xaa Xaa Xaa Xaa Xaa Xaa Xaa
                3365                3370                3375

Xaa Xaa Xaa Xaa Xaa Xaa Xaa Xaa Xaa Xaa Xaa Xaa Xaa Xaa Xaa Xaa
            3380                3385                3390

Xaa Xaa Xaa Xaa Xaa Xaa Xaa Xaa Xaa Xaa Xaa Xaa Xaa Xaa Xaa Xaa
        3395                3400                3405

Xaa Xaa Xaa Xaa Xaa Xaa Xaa Xaa Xaa Xaa Xaa Xaa Xaa Xaa Xaa Xaa
    3410                3415                3420

Xaa Xaa Xaa Xaa Xaa Xaa Xaa Xaa Xaa Xaa Xaa Xaa Xaa Xaa Xaa Xaa
3425               3430                3435                3440

Xaa Xaa Xaa Xaa Xaa Xaa Xaa Xaa Xaa Xaa Xaa Xaa Xaa Xaa Xaa Xaa
                3445                3450                3455

Xaa Xaa Xaa Xaa Xaa Xaa Xaa Xaa Xaa Xaa Xaa Xaa Xaa Xaa Xaa Xaa
            3460                3465                3470

Xaa Xaa Xaa Xaa Xaa Xaa Xaa Xaa Xaa Xaa Xaa Xaa Xaa Xaa Xaa Xaa
        3475                3480                3485

Xaa Xaa Xaa Xaa Xaa Xaa Xaa Xaa Xaa Xaa Xaa Xaa Xaa Xaa Xaa Xaa
    3490                3495                3500

Xaa Xaa Xaa Xaa Xaa Xaa Xaa Xaa Xaa Xaa Xaa Xaa Xaa Xaa Xaa Xaa
3505                3510                3515                3520

Xaa Xaa Xaa Xaa Xaa Xaa Xaa Xaa Xaa Xaa Xaa Xaa Xaa Xaa Xaa Xaa
                3525                3530                3535

Xaa Xaa Xaa Xaa Xaa Xaa Xaa Xaa Xaa Xaa Xaa Xaa Xaa Xaa Xaa Xaa
            3540                3545                3550

Xaa Xaa Xaa Xaa Xaa Xaa Xaa Xaa Xaa Xaa Xaa Xaa Xaa Xaa Xaa Xaa
        3555                3560                3565

Xaa Xaa Xaa Xaa Xaa Xaa Xaa Xaa Xaa Xaa Xaa Xaa Xaa Xaa Xaa Xaa
    3570                3575                3580

Xaa Xaa Xaa Xaa Xaa Xaa Xaa Xaa Xaa Xaa Xaa Xaa Xaa Xaa Xaa Xaa
3585                3590                3595                3600

Xaa Xaa Xaa Xaa Xaa Xaa Xaa Xaa Xaa Xaa Xaa Xaa Xaa Xaa Xaa Xaa
                3605                3610                3615
```

-continued

```
Xaa Xaa Xaa Xaa Xaa Xaa Xaa Xaa Xaa Xaa Xaa Xaa Xaa Xaa Xaa Xaa
            3620                3625                3630

Xaa Xaa Xaa Xaa Xaa Xaa Xaa Xaa Xaa Xaa Xaa Xaa Xaa Xaa Xaa Xaa
        3635                3640                3645

Xaa Xaa Xaa Xaa Xaa Xaa Xaa Xaa Xaa Xaa Xaa Xaa Xaa Xaa Xaa Xaa
    3650                3655                3660

Xaa Xaa Xaa Xaa Xaa Xaa Xaa Xaa Xaa Xaa Xaa Xaa Xaa Xaa Xaa Xaa
3665                3670                3675                3680

Xaa Xaa Xaa Xaa Xaa Xaa Xaa Xaa Xaa Xaa Xaa Xaa Xaa Xaa Xaa Xaa
                3685                3690                3695

Xaa Xaa Xaa Xaa Xaa Xaa Xaa Xaa Xaa Xaa Xaa Xaa Xaa Xaa Xaa Xaa
            3700                3705                3710

Xaa Xaa Xaa Xaa Xaa Xaa Xaa Xaa Xaa Xaa Xaa Xaa Xaa Xaa Xaa Xaa
        3715                3720                3725

Xaa Xaa Xaa Xaa Xaa Xaa Xaa Xaa Xaa Xaa Xaa Xaa Xaa Xaa Xaa Xaa
    3730                3735                3740

Xaa Xaa Xaa Xaa Xaa Xaa Xaa Xaa Xaa Xaa Xaa Xaa Xaa Xaa Xaa Xaa
3745                3750                3755                3760

Xaa Xaa Xaa Xaa Xaa Xaa Xaa Xaa Xaa Xaa Xaa Xaa Xaa Xaa Xaa Xaa
                3765                3770                3775

Xaa Xaa Xaa Xaa Xaa Xaa Xaa Xaa Xaa Xaa Xaa Xaa Xaa Xaa Xaa Xaa
            3780                3785                3790

Xaa Xaa Xaa Xaa Xaa Xaa Xaa Xaa Xaa Xaa Xaa Xaa Xaa Xaa Xaa Xaa
        3795                3800                3805

Xaa Xaa Xaa Xaa Xaa Xaa Xaa Xaa Xaa Xaa Xaa Xaa Xaa Xaa Xaa Xaa
    3810                3815                3820

Xaa Xaa Xaa Xaa Xaa Xaa Xaa Xaa Xaa Xaa Xaa Xaa Xaa Xaa Xaa Xaa
3825                3830                3835                3840

Xaa Xaa Xaa Xaa Xaa Xaa Xaa Xaa Xaa Xaa Xaa Xaa Xaa Xaa Xaa Xaa
                3845                3850                3855

Xaa Xaa Xaa Xaa Xaa Xaa Xaa Xaa Xaa Xaa Xaa Xaa Xaa Xaa Xaa Xaa
            3860                3865                3870

Xaa Xaa Xaa Xaa Xaa Xaa Xaa Xaa Xaa Xaa Xaa Xaa Xaa Xaa Xaa Xaa
        3875                3880                3885

Xaa Xaa Xaa Xaa Xaa Xaa Xaa Xaa Xaa Xaa Xaa Xaa Xaa Xaa Xaa Xaa
    3890                3895                3900

Xaa Xaa Xaa Xaa Xaa Xaa Xaa Xaa Xaa Xaa Xaa Xaa Xaa Xaa Xaa Xaa
3905                3910                3915                3920

Xaa Xaa Xaa Xaa Xaa Xaa Xaa Xaa Xaa Xaa Xaa Xaa Xaa Xaa Xaa Xaa
                3925                3930                3935

Xaa Xaa Xaa Xaa Xaa Xaa Xaa Xaa Xaa Xaa Xaa Xaa Xaa Xaa Xaa Xaa
            3940                3945                3950

Xaa Xaa Xaa Xaa Xaa Xaa Xaa Xaa Xaa Xaa Xaa Xaa Xaa Xaa Xaa Xaa
        3955                3960                3965

Xaa Xaa Xaa Xaa Xaa Xaa Xaa Xaa Xaa Xaa Xaa Xaa Xaa Xaa Xaa Xaa
    3970                3975                3980

Xaa Xaa Xaa Xaa Xaa Xaa Xaa Xaa Xaa Xaa Xaa Xaa Xaa Xaa Xaa Xaa
3985                3990                3995                4000

Xaa Xaa Xaa Xaa Xaa Xaa Xaa Xaa Xaa Xaa Xaa Xaa Xaa Xaa Xaa Xaa
                4005                4010                4015

Xaa Xaa Xaa Xaa Xaa Xaa Xaa Xaa Xaa Xaa Xaa Xaa Xaa Xaa Xaa Xaa
            4020                4025                4030

Xaa Xaa Xaa Xaa Xaa Xaa Xaa Xaa Xaa Xaa Xaa Xaa Xaa Xaa Xaa Xaa
        4035                4040                4045
```

-continued

```
Xaa Xaa Xaa Xaa Xaa Xaa Xaa Xaa Xaa Xaa Xaa Xaa Xaa Xaa Xaa Xaa
    4050                4055                4060

Xaa Xaa Xaa Xaa Xaa Xaa Xaa Xaa Xaa Xaa Xaa Xaa Xaa Xaa Xaa Xaa
4065                4070                4075                4080

Xaa Xaa Xaa Xaa Xaa Xaa Xaa Xaa Xaa Xaa Xaa Xaa Xaa Xaa Xaa Xaa
                4085                4090                4095

Xaa Xaa Xaa Xaa Xaa Xaa Xaa Xaa Xaa Xaa Xaa Xaa Xaa Xaa Xaa Xaa
            4100                4105                4110

Xaa Xaa Xaa Xaa Xaa Xaa Xaa Xaa Xaa Xaa Xaa Xaa Xaa Xaa Xaa Xaa
        4115                4120                4125

Xaa Xaa Xaa Xaa Xaa Xaa Xaa Xaa Xaa Xaa Xaa Xaa Xaa Xaa Xaa Xaa
    4130                4135                4140

Xaa Xaa Xaa Xaa Xaa Xaa Xaa Xaa Xaa Xaa Xaa Xaa Xaa Xaa Xaa Xaa
4145                4150                4155                4160

Xaa Xaa Xaa Xaa Xaa Xaa Xaa Xaa Xaa Xaa Xaa Xaa Xaa Xaa Xaa Xaa
                4165                4170                4175

Xaa Xaa Xaa Xaa Xaa Xaa Xaa Xaa Xaa Xaa Xaa Xaa Xaa Xaa Xaa Xaa
            4180                4185                4190

Xaa Xaa Xaa Xaa Xaa Xaa Xaa Xaa Xaa Xaa Xaa Xaa Xaa Xaa Xaa Xaa
        4195                4200                4205

Xaa Xaa Xaa Xaa Xaa Xaa Xaa Xaa Xaa Xaa Xaa Xaa Xaa Xaa Xaa Xaa
    4210                4215                4220

Xaa Xaa Xaa Xaa Xaa Xaa Xaa Xaa Xaa Xaa Xaa Xaa Xaa Xaa Xaa Xaa
4225                4230                4235                4240

Xaa Xaa Xaa Xaa Xaa Xaa Xaa Xaa Xaa Xaa Xaa Xaa Xaa Xaa Xaa Xaa
                4245                4250                4255

Xaa Xaa Xaa Xaa Xaa Xaa Xaa Xaa Xaa Xaa Xaa Xaa Xaa Xaa Xaa Xaa
            4260                4265                4270

Xaa Xaa Xaa Xaa Xaa Xaa Xaa Xaa Xaa Xaa Xaa Xaa Xaa Xaa Xaa Xaa
        4275                4280                4285

Xaa Xaa Xaa Xaa Xaa Xaa Xaa Xaa Xaa Xaa Xaa Xaa Xaa Xaa Xaa Xaa
    4290                4295                4300

Xaa Xaa Xaa Xaa Xaa Xaa Xaa Xaa Xaa Xaa Xaa Xaa Xaa Xaa Xaa Xaa
4305                4310                4315                4320

Xaa Xaa Xaa Xaa Xaa Xaa Xaa Xaa Xaa Xaa Xaa Xaa Xaa Xaa Xaa Xaa
                4325                4330                4335

Xaa Xaa Xaa Xaa Xaa Xaa Xaa Xaa Xaa Xaa Xaa Xaa Xaa Xaa Xaa Xaa
            4340                4345                4350

Xaa Xaa Xaa Xaa Xaa Xaa Xaa Xaa Xaa Xaa Xaa Xaa Xaa Xaa Xaa Xaa
        4355                4360                4365
```

OIL-IN-WATER EMULSION

TECHNICAL FIELD OF THE INVENTION

The present invention is directed to oil-in-water (o/w) emulsions. In particular, the present invention is directed to oil-in-water emulsions that are resistant to oxidisation.

BACKGROUND TO THE INVENTION

A wide variety of consumer goods contain oil-in-water emulsions including cosmetic preparations (e.g. skin creams, moisturisers, lotions, and hair and skin conditioning agents) and food products (e.g. dressings, ice creams, mayonnaises, spreads and sauces). The physio-chemical properties of the emulsions are critical for ensuring consumer acceptance of these products and furthermore the stability of the emulsion and of the ingredients therein is vital for ensuring the shelf-life of such products.

There are a number of mechanisms that degrade the quality of a product comprising an oil-in-water emulsion. Flocculation is the process by which particles in the emulsion are caused to clump together which may then float to the top of the continuous phase or settle to the bottom of the continuous phase. Creaming is the migration of a substance in an emulsion, under the influence of buoyancy, to the top of a sample while the particles of the substance remain separated. Breaking and coalescence is where the particles coalesce and form a layer within the continuous phase. Unstable emulsions are particularly susceptible to these mechanisms and suffer a break down in the physio-chemical structure of the emulsion and the loss of the beneficial properties required by consumers. The quality of a product comprising an oil-in-water emulsion can be further affected through the degradation of the oil. Oxidation is one such process that may cause degradation and can lead to rancidity and the loss of important functional ingredients. In their paper, Askolin of al. (Biomacromolecules, 2006, 7 (4), 1295-1301) disclose that olive oil and paraffin were emulsified in an aqueous hydrophobin solution by sonication however, this paper does not deal with the prevention of oxidation and moreover the emulsions were not stable.

There therefore remains a need for oil-in-water emulsions with improved shelf-lives that are resistant to oxidisation of oil therein.

Tests and Definitions

Unless defined otherwise, all technical and scientific terms used herein have the same meaning as commonly understood by one of ordinary skill in the art (e.g. colloid chemistry).

Oil

As used herein the term "oil" is used as a generic term for lipids, fats or any mixture thereof, either pure or containing compounds in solution. Oils can also contain particles in suspension.

Lipids

As used herein the term "lipids" is used as a generic term for long chain fatty acids or long chain alcohols wherein the term "long chain" is used as a generic term for 12 carbon atoms or more.

Fats

As used herein the term "fats" is used as a generic term for compounds containing more than 80% triglycerides. They can also contain diglycerides, monoglycerides and free fatty acids. In common language, liquid fats are often referred to as oils but herein the term fats is also used as a generic term for such liquid fats. Fats include: plant oils (for example: Apricot Kernel Oil, Arachis Oil, Arnica Oil, Argan Oil, Avocado Oil, Babassu Oil, Baobab Oil, Black Seed Oil, Blackberry Seed Oil, Blackcurrant Seed Oil, Blueberry Seed Oil, Borage Oil, Calendula Oil, Camelina Oil, Camellia Seed Oil, Castor Oil, Cherry Kernel Oil, Cocoa Butter, Coconut Oil, Corn Oil, Cottonseed Oil, Evening Primrose Oil, Grapefruit Oil, Grapeseed Oil, Hazelnut Oil, Hempseed Oil, Jojoba Oil, Lemon Seed Oil, Lime Seed Oil, Linseed Oil, Kukui Nut Oil, Macadamia Oil, Maize Oil, Mango Butter, Meadowfoam Oil, Melon Seed Oil, Moring a Oil, Olive Oil, Orange Seed Oil, Palm Oil, Papaya Seed Oil, Passion Seed Oil, Peach. Kernel Oil, Plum Oil, Pomegranate Seed. Oil, Poppy Seed Oil, Pumpkins Seed Oil, Rapeseed (or Canola) Oil, Red Raspberry Seed Oil, Rice Bran Oil, Rosehip Oil, Safflower Oil, Seabuckthorn Oil, Sesame Oil, Soyabean Oil, Strawberry Seed Oil, Sunflower Oil, Sweet Almond Oil, Walnut Oil, Wheat Germ Oil); fish oils (for example: Sardine Oil, Mackerel Oil, Herring Oil, Cod-liver Oil, Oyster Oil); animal oils (for example: Conjugated Linoleic Acid); or other oils (for example: Paraffinic Oils, Naphthenic Oils, Aromatic Oils, Silicone Oils); or any mixture thereof.

Iodine Value

As used herein the term "iodine value" is used as a generic term for the measure of the unsaturation of oil and is expressed in terms of the number of centigrammes of iodine absorbed per gramme of sample (% iodine absorbed). The higher the iodine number, the more unsaturated double bonds are present in oil and hence the more prone the oil is to oxidisation via the double bond. Iodine value is determined using the Wijs Method as provided in the American Oil Chemists' Society (AOCS) Official Method Tg 1a-64, pages 1-2, Official Methods and Recommended Practices of the American Oil Chemists' Society, Second Edition, edited by D. Firestone, AOCS Press, Champaign, 1990, method Revised 1990).

Calculation of Ratio of Hydrophobin to Oil

As used herein the term "ratio of hydrophobin to oil" is defined as the mass of hydrophobin (in grammes) relative to the volume of the oil (in liters) in the oil-in-water emulsion. The ratio of hydrophobin to oil is therefore expressed as:

$$\text{Total mass of Hydrophobin in emulsion (grammes)}:\text{Total volume of oil in emulsion (liters)}=\text{g/liter}$$

Calculation of Ratio of Oil to Water

As used herein the term "ratio of oil to water" is defined as the volume of oil (in milliliters) relative to the volume of the water (in milliliters) in the oil-in-water emulsion. The ratio of oil to water is therefore expressed as:

$$(\text{Total volume of oil in emulsion (milliliters)}/\text{Total volume of water in emulsion (milliliters)})\times 100=\text{v/v }\%$$

Oil-in-Water Emulsion

As used herein the term "oil-in-water emulsion" is used as a generic term for a mixture of two immiscible phases wherein an oil (dispersed phase) is dispersed in an aqueous solution (the continuous phase).

Food Products

As used herein the term "food products" is used as a generic term for products and ingredients taken by the mouth, the constituents of which are active in and/or absorbed by the gastrointestinal tract with the purpose of nourishment of the body and its tissues, refreshment and indulgence, which products are to be marketed and sold to customers for consumption by humans. Examples of food products are tea, including precursors thereof; spreads; ice cream; frozen fruits and vegetables; snacks including diet foods and beverages; condiments; dressings; and culinary aids. Food products may particularly bring any of the following benefits: healthy metabolism; life span extension; optimal growth and development; optimal gastrointestinal tract function; avoidance of metabolic syndrome and insulin resistance; avoidance of dyslipidemias; weight control; healthy mineral metabolism; immune health; optimal eye health; avoidance of cognitive impairment and memory loss; hair and skin health; beauty; and excellent taste and smell.

Spreads

As used herein the term "spreads" is used as a generic term for oil and water containing emulsion, for instance a margarine type spread. Advantageously a spread has a pH of 4.8-6.0. The pH can be measured by melting the spread, separating the molten fat phase from the water phase and measuring the pH of the water phase.

Spreads of the invention may comprise other ingredients commonly used for spreads, such as flavouring ingredients, thickeners, gellation agents, colouring agents, vitamins, emulsifiers, pH regulators, stabilizers etc. Common amounts of such ingredients as well as suitable ways to prepare margarines or spreads are well-known to the skilled person.

Dressings

As used herein the term "dressings" is used as a generic term for oil and water containing emulsion, for instance vinaigrette and salad-dressing type compositions.

Aeration

The term "aerated" means that gas has been intentionally incorporated into the product, such as by mechanical means. The gas can be any gas, but is preferably, particularly in the context of food products, a food-grade gas such as air, nitrogen or carbon dioxide. The extent of aeration is typically defined in terms of "overrun". In the context of the present invention, % overrun is defined in volume terms as:

$$\text{Overrun}=((\text{volume of the final aerated product}-\text{volume of the mix})/\text{volume of the mix})\times 100$$

The amount of overrun present in the product will vary depending on the desired product characteristics. For example, the level of overrun in confectionery such as mousses can be as high as 200 to 250%. The level of overrun in some chilled products, ambient products and hot products can be lower, but generally over 10%, e.g. the level of overrun in milkshakes is typically from 10 to 40%.

Hydrophobins

Hydrophobins are a well-defined class of proteins (Wessels, 1997, Adv. Microb. Physio. 38: 1-45; Wosten, 2001, Annu Rev. Microbiol. 55: 625-646) capable of self-assembly at a hydrophobic/hydrophilic interface, and having a conserved sequence:

```
                                        (SEQ ID No. 1)
Xn-C-X5-9-C-C-X11-39-C-X8-23-C-X5-9-C-C-X6-18-
C-Xm
```

where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

```
                                        (SEQ ID No. 2)
Xn-C-X1-50-C-X0-5-C-X1-100-C-X1-100-C-X1-50-C-
X0-5-C-X1-50-C-Xm
```

or parts thereof still displaying the characteristic of self-assembly at a hydrophobic-hydrophilic interface resulting in a protein film. In accordance with the definition of the present invention, self-assembly can be detected by adsorbing the protein to Teflon and using Circular Dichroism to establish the presence of a secondary structure (in general, α-helix) (De Vocht et al., 1998, Biophys. J. 74: 2059-68).

The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Hydrophobins identified to date are generally classed as either class I or class II. Both types have been identified in fungi as secreted proteins that self-assemble at hydrophobilic interfaces into amphipathic films. Assemblages of class I hydrophobins are relatively insoluble whereas those of class II hydrophobins readily dissolve in a variety of solvents.

Hydrophobin-like proteins have also been identified in filamentous bacteria, such as *Actinomycete* and *Steptomyces* sp. (WO01/74864). These bacterial proteins, by contrast to fungal hydrophobins, form only up to one disulphide bridge since they have only two cysteine residues. Such proteins are an example of functional equivalents to hydrophobins having the consensus sequences shown in SEQ ID Nos. 1 and 2, and are within the scope of the present invention.

The hydrophobins can be obtained by extraction from native sources, such as filamentous fungi, by any suitable process. For example, hydrophobins can be obtained by culturing filamentous fungi that secrete the hydrophobin into the growth medium or by extraction from fungal mycelia with 60% ethanol. It is particularly preferred to isolate hydrophobins from host organisms that naturally secrete hydrophobins. Preferred hosts are hyphomycetes (e.g. *Trichoderma*), *basidiomycetes* and ascomycetes. Particularly preferred hosts are food grade organisms, such as *Cryphonectria* parasitica which secretes a hydrophobin termed cryparin (MacCabe and Van Alfen, 1999, App. Environ. Microbiol 65: 5431-5435).

Alternatively, hydrophobins can be obtained by the use of recombinant technology. For example host cells, typically micro-organisms, may be modified to express hydrophobins and the hydrophobins can then be isolated and used in accordance with the present invention. Techniques for introducing nucleic acid constructs encoding hydrophobins into host cells are well known in the art. More than 34 genes coding for hydrophobins have been cloned, from over 16 fungal species (see for example WO96/41882 which gives the sequence of hydrophobins identified in *Agaricus Bisporus*; and Wosten, 2001, Annu Rev. Microbiol. 55: 625-646). Recombinant technology can also be used to modify hydrophobin sequences or synthesise novel hydrophobins having desired/improved properties.

Typically, an appropriate host cell or organism is transformed by a nucleic acid construct that encodes the desired hydrophobin. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species, include yeasts such as (but not limited to) those of the genera *Saccharomyces, Kluyveromyces, Pichia, Hansenula, Candida, Schizo saccharomyces* and the like, and filamentous species such as (but not limited to) those of the genera *Aspergillus, Trichoderma, Mucor, Neurospora, Fusarium* and the like.

The sequences encoding the hydrophobins are preferably at least 80% identical at the amino acid level to a hydrophobin identified in nature, more preferably at least 95% or 100% identical. However, persons skilled in the art may make conservative substitutions or other amino acid changes that do not reduce the biological activity of the hydrophobin. For the purpose of the invention these hydrophobins possessing this high level of identity to a hydrophobin that naturally occurs are also embraced within the term "hydrophobins".

Hydrophobins can be purified from culture media or cellular extracts by, for example, the procedure described in WO01/57076 which involves adsorbing the hydrophobin present in a hydrophobin-containing solution to surface and then contacting the surface with a surfactant, such as Tween 20, to elute the hydrophobin from the surface. See also Cohen et al., 2002, Biochim Biophys Acta. 1569: 139-50; Calonje et al., 2002, Can. J. Microbiol. 48: 1030-4; Askolin et al., 2001, Appl Microbiol Biotechnol. 57: 124-30; and De Vries et al., 1999, Eur J. Biochem. 262: 377-85.

Shelf-Life

As used herein the term "shelf-life" is used as a generic term for the length of time that a consumer product such as a food product may be considered suitable for sale or consumption. In particular, shelf-life is the time that products can be stored, during which the defined quality of a specified proportion of the goods remains acceptable under expected (or specified) conditions of distribution, storage and display. In the instant case, shelf-life refers to the length of time that an oil-in-water emulsion maintains the physio-chemical properties critical for ensuring consumer acceptance of these products.

BRIEF DESCRIPTION OF THE INVENTION

We have now found that oil-in-water emulsions that are resistant to oxidisation may be obtained in formulations comprising certain amounts of hydrophobin and oil.

Accordingly, in a first aspect, the present invention provides an oil-in-water emulsion comprising hydrophobin and oil wherein the oil-in-water emulsion has an overrun of less than 35% and wherein the oil has an iodine value of greater than 40 characterised in that the ratio of hydrophobin to oil is greater than 20 g/liter, the ratio of oil to water being greater than 1 v/v % preferably greater than 2 v/v %, more preferably greater than 4 v/v %, more preferably still greater than 5 v/v %, yet more preferably greater than 7 v/v %, most preferably greater than 15 v/v %.

Having conducted extensive research into the stabilisation of oil-in-water emulsions and the prevention of degradation thereof we have found that the advantage of the ratio of hydrophobin to oil is that in such emulsions oxidisation of oil in the dispersed phase is significantly reduced. Accordingly the ratio of hydrophobin to oil is preferably greater than 30 g/liter, more preferably greater than 40 g/liter, more preferably still greater than 60 g/liter and most preferably greater than 80 g/liter.

As set out above, the hydrophobin may be a class I or a class II hydrophobin, preferably a class II hydrophobin, more preferably the hydrophobin is HFBII.

The invention is particularly suitable to unaerated oil-in-water emulsions and accordingly, the overrun is preferably less than 25%, more preferably less than 20%, more preferably still less than 10%, most preferably less than 5%.

The invention is capable of preventing the degradation of oxidisable oils and accordingly in a preferred embodiment the iodine value of the oil is greater than 60, more preferably greater than 90, more preferably still greater than 120, most preferably greater than 140.

Particular oils are especially suitable for use according to the invention and accordingly the oil is preferably selected from the group consisting of olive oil, corn oil, canola oil, soybean oil, sunflower oil, linseed oil, and any mixture thereof.

In a second aspect, the present invention provides food products comprising an oil-in-water emulsion comprising hydrophobin and oil wherein the oil-in-water emulsion has an overrun of less than 35% and wherein the oil phase has an iodine value of greater than 40 characterised in that the ratio of hydrophobin to oil is greater than 20 g/liter, the ratio of oil to water being greater that 1 v/v %, preferably greater than 2 v/v %, more preferably greater than 4 v/v %, more preferably still greater than 5 v/v %, yet more preferably greater than 7 v/v %, most preferably greater than 15 v/v %.

The products are preferably food products wherein the food products are selected from the group consisting of dressings, ice creams, mayonnaises, spreads and sauces.

DETAILED DESCRIPTION OF THE INVENTION

Examples

Hydrophobin

HFBII (Mw=7200 g·mol-1) solution from VTT Biotechnology Finland was used for all experiments. Unless otherwise stated, all water used for the experiments was of Millipore quality.

Oils

Purified sunflower oil (SFO) was used for all experiments. The composition and Iodine Value of the sunflower oil used is given in Table 1.

TABLE 1

Composition and Iodine Value of Sunflower Oil

| Fatty Acid | Composition of Sunflower Oil (%) |
|---|---|
| C6 | 0 |
| C8 | 0 |
| C10 | 0 |
| C12 | 0 |
| C14 | 0.1 |
| C16 | 5.5 |
| C16:1 | 0.1 |
| C18 | 4.7 |
| C18:1 | 19.5 |
| C18:2 | 68.5 |
| C18:3 | 0.1 |
| C20 | 0.3 |
| C20:1 | 0.1 |

TABLE 1-continued

Composition and Iodine Value of Sunflower Oil

| Fatty Acid | Composition of Sunflower Oil (%) |
|---|---|
| C22 | 0.9 |
| C22:1 | 0 |
| C24 | 0.2 |
| | Iodine Value = 135.8 |

Preparation of Hydrophobin (HFB) and Whey Protein Isolate (WPI) Solutions pH adjusted Double Distilled Water (DDW) at pH 2, pH 3 and pH 7 was prepared using 0.1M HCI or 0.1M NaOH. HFB or WPI was then incorporated into each pH adjusted DDW to a concentration of 0.2 wt % and the pH of the final solutions with each protein were adjusted with 0.1M HCI or NaOH to pH 2, 3 or 7. To these solutions, SFO was added and homogenized as follows.

Preparation of Emulsions

Compositions according to Table 2 were first subjected to Ultraturrax at 6, 500 RPM for 1 min, followed by 24,000 RPM for 10 min with continuous shaking of the beaker and then carefully transferred to Microfluidizer (MF) in order not to introduce unnecessary foam formation and subjected to MF at 1000 bar for 5 min with ice to prevent temperature increase. Bottles of emulsions were then sealed and pasteurized at 80° C. for 10 minutes and then allowed to cool. The emulsions were unaerated and thus had an overrun of 25%.

TABLE 2

Composition of emulsions

| | Comparative Example 1 | Example A |
|---|---|---|
| 0.2% HFB solution | — | 9.5 g |
| 0.2% WPI solution | 9.5 g | — |
| Sunflower Oil | 0.5 g | 0.5 g |

Accelerated Oxidation Test

An accelerated oxidation test was performed on the pH 2, 3 and 7 emulsions of Comparative Example 1 and Example A as provided below. The accelerated oxidation test was carried out over 42 days at 40° C. because the period and temperature are representative of a period of from 9 to 12 months at a temperature of 20° C. The accelerated oxidation test assesses the progress of oxidation through the measurement of volatile components resulting from oxidation and was performed as follows:

1. 1 ml aliquots of Comparative Example 1 and Example A were separated into individual vials.
2. The air in the headspace of the vials was flushed out with nitrogen gas.
3. The vials were sealed with a cap with a rubber septum.
4. All vials were placed in an incubator at 40° C. in the absence of light for 42 days.
5. After the 42 day experimental period the vials were removed from the incubator and cooled in the absence of light to allow hexanal to dissolve back into the emulsion. After cooling, the head space of the vials was again flushed with nitrogen gas.
6. Gas Chromatography (GC) was performed to detect volatile components. During GC, the vials were heated to 60° C. to release volatile components from the emulsion into the headspace which was subsequently measured using GC. The levels of volatile components detected using GS was expressed as peak area as calculated from the chromatograms. Among the various volatiles, hexanal is the most common representative of oxidation and the results therefore present only Hexanal.

The results of the oxidation test for 42 days at 40° C. as shown in Tables 3-5 show that HFB stabilized emulsions are less oxidized than WPI stabilized emulsions.

TABLE 3

Results of accelerated oxidation test of pH 2 emulsions after 42 days

| | Peak Area (μV/s) |
|---|---|
| Comparative Example 1 | 2890470 |
| Example A | 81778 |

TABLE 4

Results of accelerated oxidation test of pH 3 emulsions after 42 days

| | Peak Area (μV/s) |
|---|---|
| Comparative Example 1 | 2700784 |
| Example A | 153887 |

TABLE 5

Results of accelerated oxidation test of pH 7 emulsions after 42 days

| | Peak Area (μV/s) |
|---|---|
| Comparative Example 1 | 2549786 |
| Example A | 1883759 |

The invention claimed is:

1. An o/w emulsion comprising hydrophobin and oil wherein the o/w emulsion has an overrun of less than 35% and wherein the oil phase has an iodine value of greater than 40 characterised in that the ratio of hydrophobin to oil is greater than 20 g/liter, the ratio of oil to water being greater than 1 v/v % and wherein the oil in the o/w emulsion has a greater oxidative stability in the pH range of 2 to 7 in the presence of hydrophobin compared to the case when the hydrophobin is replaced by the same quantity of whey protein isolate under accelerated oxidation conditions of holding the o/w emulsion at 40 C for 42 days in the dark.

2. An o/w emulsion according to claim 1 wherein the ratio of oil to water is greater than 2 v/v %.

3. An o/w emulsion according to claim 2 wherein the ratio of oil to water is greater than 4 v/v %.

4. An o/w emulsion according to claim 2 wherein the ratio oil to water is greater than 5 v/v %.

5. An o/w emulsion according to claim 2 wherein the ratio of to water is greater than 7 v/v %.

6. An o/w emulsion according to claim 2 wherein the ratio of oil to water is greater than 15 v/v%.

7. An o/w emulsion according to claim 1 wherein the hydrophobin is a class 1 or a class 2 hydrophobin.

8. An o/w emulsion according to claim 1 wherein the overrun is less than 25%.

9. An o/w emulsion according to claim 1 wherein the iodine value of the oil is greater than 60.

10. An o/w emulsion according to claim 1 wherein the oil is selected from the group consisting of olive oil, corn oil, canola oil, soybean oil, sunflower oil, linseed oil, and any mixture thereof.

11. An o/w emulsion according to claim 1 wherein the ratio of hydrophobin to oil is greater than 30 g/liter.

12. An o/w emulsion according to claim 1 wherein the hydrophobin is a class 2 hydrophobin.

13. An o/w emulsion according to claim 1 wherein the hydrophobin is a HFBII.

14. An emulsion according to claim 1 wherein the overrun is less than 15%.

15. An o/w emulsion according to claim 1 wherein the iodine value of the oil is greater than 90.

16. An o/w emulsion according to claim 1 wherein the iodine value of the oil is greater than 120.

17. An o/w emulsion according to claim 1 wherein the iodine value of the oil is greater than 140.

18. An o/w emulsion according to claim 1 wherein the ratio of hydrophobin to oil is greater than 40 g/liter.

19. An o/w emulsion according to claim 1 wherein the ratio of hydrophobin to oil is greater than 60 g/liter.

20. A food product comprising an oil-in--water emulsion comprising hydrophobin and oil wherein the oil-in-water emulsion has an overrun of less than 35% and wherein the oil phase has an iodine value of greater than 40 characterised in that the ratio of hydrophobin to oil is greater than 20 g/liter, the ratio of oil to water being greater than 1 v/v % and wherein the oil in the o/w emulsion has a greater oxidative stability in the pH range of 2 to 7 in the presence of hydrophobin compared to the case when the hydrophobin is replaced by the same quantity of whey protein isolate under accelerated oxidation conditions of holding the o/w emulsion at 40 C for 42 days in the dark.

* * * * *